(12) United States Patent
Murade

(10) Patent No.: US 7,570,334 B2
(45) Date of Patent: Aug. 4, 2009

(54) ELECTRO-OPTICAL DEVICE AND ELECTRONIC APPARATUS

(75) Inventor: Masao Murade, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 141 days.

(21) Appl. No.: 11/810,083

(22) Filed: Jun. 4, 2007

(65) Prior Publication Data

US 2007/0296899 A1    Dec. 27, 2007

(30) Foreign Application Priority Data

Jun. 23, 2006    (JP)    ............................. 2006-173932

(51) Int. Cl.
*G02F 1/133*    (2006.01)
*G02F 1/1333*    (2006.01)
*G02F 1/1339*    (2006.01)

(52) U.S. Cl. .................. 349/139; 349/153; 349/155

(58) Field of Classification Search .................. 349/139, 349/149, 153, 155
See application file for complete search history.

(56) References Cited

U.S. PATENT DOCUMENTS 6,750,937 B2 *    6/2004    Karasawa et al. ........... 349/153

FOREIGN PATENT DOCUMENTS

| JP | 06-148678 | * | 5/1994 |
|----|-----------|---|--------|
| JP | 10-253990 | A | 9/1998 |
| JP | 2001-330848 | | 11/2001 |
| JP | 2002-214637 | | 7/2002 |
| JP | 2003-177426 | | 6/2003 |

* cited by examiner

*Primary Examiner*—Frank G Font
*Assistant Examiner*—Michael P Mooney
(74) *Attorney, Agent, or Firm*—AdvantEdge Law Group, LLC

(57) ABSTRACT

An electro-optical device includes a pair of an opposing substrate and an element substrate, pixel electrodes, a sealing member, an opposing electrode, a vertical-conduction electrode, and a vertical-conduction member. The opposing substrate and element substrate are bonded with the sealing member so as to oppose each other. The pixel electrodes are arrayed on the element substrate in a pixel region. The sealing member is provided in a sealing region located around the pixel region. The opposing electrode is provided on the opposing substrate so as to oppose the pixel electrodes. The vertical-conduction electrode is formed in the sealing region extending along at least one edge of the element substrate. The vertical-conduction member is provided in the sealing region and electrically connected to the vertical-conduction electrode and the opposing electrode.

14 Claims, 20 Drawing Sheets

ELECTRO-OPTICAL DEVICE AND ELECTRONIC APPARATUS

BACKGROUND

1. Technical Field

The present invention relates to electro-optical devices, such as liquid crystal devices, and to electronic apparatuses including the electro-optical devices, such as liquid crystal projectors.

2. Related Art

In such an electro-optical device, an electro-optical material is held between a pair of an opposing substrate and an element substrate bonded with each other via a sealing member, as described, for example, in JP-A-10-253990. In a peripheral region located around a pixel region on the element substrate, for example, vertical-conduction terminals are provided at the four corners of the element substrate, and vertical-conduction members disposed in association with the vertical-conduction terminals and electrically connected to the vertical-conduction terminals are provided between the opposing substrate and the element substrate, whereby vertical electrical conduction between the pair of substrates is achieved.

Between the opposing substrate and the element substrate, the sealing member is provided in a sealing region provided in the peripheral region around the pixel region. Furthermore, between the opposing substrate and the element substrate, the sealing member is provided between the vertical-conduction terminals and vertical conduction members and the pixel region so as not to overlap the vertical-conduction terminals and vertical-conduction members at the corners of the pair of substrates.

However, in the electro-optical device described above, since vertical electrical conduction is provided locally in association with the vertical-conduction terminals between the opposing substrate and the element substrate, when errors from design occur in the configuration or layout of the vertical-conduction terminals and vertical-conduction members when the electro-optical device is manufactured, vertical conduction could be inadequate when the electro-optical device is driven. When inadequate vertical conduction occurs, the potential of an opposing electrode provided on the opposing substrate, opposing pixel electrodes provided for individual pixels on the element substrate, varies from a predetermined value. This causes display defects and therefore degradation of the quality of image display. Particularly, with the reduction in the size of the electro-optical device, such errors could occur more often during manufacturing, so that inadequate vertical conduction due to such errors could also occur more often.

Furthermore, when the resolution of the electro-optical device is to be improved while reducing the size thereof, it is needed to reduce the sizes of peripheral regions on the opposing substrate and the element substrate, so that it is needed to reduce space for the sealing region and the vertical-conduction terminals and vertical-conduction members. However, as described earlier, when the sealing member is disposed so as not to overlap the vertical-conduction terminals and vertical-conduction members, it is difficult to reduces the sizes of regions needed to dispose the sealing region and the vertical-conduction terminals and vertical-conduction members at the corners of the opposing substrate and the element substrate.

SUMMARY

An advantage of some aspects of the invention is that an electro-optical device that is small in size and that allows high-quality image display, and an electronic apparatus including the electro-optical device, can be provided.

According to an aspect of the invention, there is provided an electro-optical device including a pair of an opposing substrate and an element substrate opposing each other; a plurality of pixel electrodes arrayed on the element substrate in a pixel region; a sealing member with which the opposing substrate and the element substrate are bonded with each other, the sealing member being provided in a sealing region located around the pixel region; an opposing electrode provided on the opposing substrate so as to oppose the plurality of pixel electrodes; a vertical-conduction electrode formed in the sealing region, the sealing region extending along at least one edge of the element substrate; and a vertical-conduction member provided in the sealing region and electrically connected to the vertical-conduction electrode and the opposing electrode.

In the electro-optical device described above, the sealing member with which the opposing substrate and the element substrate are bonded with each other is provided in the sealing region in the peripheral region located around the pixel region where the plurality of pixel electrodes is arrayed. Furthermore, an electro-optical material, e.g., liquid crystal, is held in a region defined by the sealing member between the opposing substrate and the element substrate. When the electro-optical device is driven, voltages defined by the potentials of the individual pixel electrodes and the opposing electrode are applied to the liquid crystal. This allows controlling the orientation of the liquid crystal on a pixel-by-pixel basis.

Furthermore, in the electro-optical device described above, on the element substrate, the vertical-conduction electrode is disposed at least partially in the sealing region when viewed in plan, along at least one edge of the element substrate. The portion provided in the sealing region serves as a vertical-conducting portion for providing electrical conduction between the element substrate and the opposing substrate via the vertical conduction member. Furthermore, the vertical-conduction member is provided in the sealing region between the opposing substrate and the element substrate and is electrically connected to the vertical-conducting portion. The vertical-conduction member may be formed continuously along the direction of the vertical-conducting portion in association of the vertical-conducting portion or locally at a plurality of points in the sealing region.

In the electro-optical device described above, in the sealing region, electrical conduction between the opposing substrate and the element substrate can be achieved via the vertical-conduction member along the vertical-conducting portion provided along at least one edge of the element substrate. With this configuration, when viewed in plan on the substrates, various elements for providing electrical conduction between the substrates can be disposed so as to overlap the sealing region. Thus, the space needed to dispose these elements can be reduced compared with the configuration described in JP-A-10-253990. Thus, the size of the peripheral region on the opposing substrate or the element substrate can be reduced. Alternatively or in addition, when peripheral circuits are provided in the peripheral region on the element substrate in order to drive a plurality of pixel portions in the pixel region, space for disposing circuit elements or lines of the peripheral circuits can be allocated more effectively. That is, even when the size of the peripheral region is reduced, a larger space can be allocated for disposing these elements. Accordingly, design flexibility regarding the layout of these elements can be increased.

Furthermore, compared with the configuration described with reference to JP-A-10-253990, in which electrical conduction is provided locally, errors from design are less likely to occur regarding the configuration of the vertical conduction electrode or vertical conduction member during manufacturing of the electro-optical device. Furthermore, even when such errors occur, it is possible to prevent inadequate vertical conduction of such an extent that causes considerable display defects.

As described above, with the electro-optical device described above, it is readily possible to reduce the size of the electro-optical device and to achieve high-quality image display even when the size is reduced.

Preferably, the vertical-conduction electrode is formed at least partially in a frame-shaped region located inside the sealing region and around the pixel region.

In this case, the vertical-conduction electrode is formed so as to extend into the frame-shaped region located inside the sealing region. Thus, for example, by using a light-blocking material to form the portion of the vertical-conduction electrode provided in the frame-shaped region, the portion can serve as a light-blocking film. That is, the frame-shaped light-blocking film, which is usually provided in the frame-shaped region, can be replaced at least partially by the vertical-conduction electrode. Thus, it is not needed to provide a frame-shaped light-blocking film separately from the vertical-conduction electrode in the frame-shaped region on the opposing substrate or the element substrate. Accordingly, the number of steps in the manufacturing process of the electro-optical device can be reduced.

The frame-shaped region is provided around the pixel region when viewed in plan on the element substrate, or the frame-shaped region is formed so as to include a region around the pixel region and overlap a partial region inside the pixel region when viewed in plan.

When the vertical-conduction electrode is formed in the frame-shaped region around the pixel region, the vertical-conduction electrode may extend into a frame-shaped region located in a portion inside a perimeter of the pixel region.

In this case, the vertical-conduction electrode can function more effectively as a frame-shaped light-blocking film.

In another exemplary configuration of the electro-optical device, the vertical-conduction electrode is provided as an opposing-electrode-potential line through which an opposing-electrode potential is supplied to the opposing electrode, is formed from a conductive film provided in a layer below the plurality of pixel electrodes via an inter-layer insulating film, and is exposed from the inter-layer insulating film at least partially in the sealing region.

In this case, when the electro-optical device is driven, on the basis of the opposing-electrode potential supplied to the vertical-conduction electrode formed as the opposing-electrode-potential line, the opposing electrode is maintained at a predetermined potential by the electrical conduction via the vertical-conduction member.

With this configuration, by using a conductive film having a relatively low resistance and provided in a layer below the pixel electrodes to form the vertical-conduction electrode, the vertical-conduction electrode can be formed to have a relatively low resistance.

In another exemplary configuration of the electro-optical device, the electro-optical device further includes an opposing-electrode-potential line provided on the element substrate, through which an opposing-electrode potential is supplied to the opposing electrode, the opposing-electrode-potential line being formed from a conductive film provided in a layer below the plurality of pixel electrodes via an inter-layer insulating film so as to overlap the vertical-conduction electrode at least partially. In this case, the vertical-conduction electrode is formed out of the same film as the plurality of pixel electrodes at least partially, and is electrically connected to the opposing-electrode-potential line via a contact hole provided in the inter-layer insulating film.

In this case, when the electro-optical device is driven, on the basis of the opposing-electrode potential supplied to the opposing-electrode-potential line, the opposing electrode is maintained at a predetermined potential by the electrical conduction via the vertical-conduction electrode and vertical-conduction member.

For example, when peripheral circuits are provided in the peripheral region on the element substrate as described earlier, preferably, circuit elements of the peripheral circuits are disposed inside or outside the sealing region. Furthermore, in order to simplify the manufacturing process of the electro-optical device, for example, the circuit elements or lines of the peripheral circuits are formed in the same step together with electronic elements or lines for driving the pixel electrodes. In this case, the circuits elements and associated parts of the peripheral circuits are formed in a layer below the pixel electrodes in accordance with the pixel configuration on the element substrate.

In this case, on the element substrate, the vertical-conduction electrode is formed at least partially out of the same film as the pixel electrodes. For example, when a portion of the vertical-conduction electrode is provided in the frame-shaped region, the portion of the vertical-conduction electrode provided in the frame-shaped region could overlap circuit elements of the peripheral circuits when viewed in plan on the element substrate. In such a case, with this configuration, compared with the configuration in which the vertical-conduction electrode is formed of the opposing-electrode-potential line in a layer below the pixel electrodes, on the element substrate, the portion of the vertical-conduction electrode overlapping the peripheral circuit is disposed in an upper layer. This serves to reduce electromagnetic effect or the like caused on the peripheral circuit due to the vertical-conduction electrode.

Thus, with this configuration, when a portion of the vertical-conduction electrode functions as a frame-shaped light-blocking film as described earlier or when the vertical-conduction electrode extends from the sealing region to outside of the sealing region in order to provide a larger capacitance, the effect on the peripheral circuits cased by the portion of the vertical-conduction electrode extending outside the sealing region can be reduced to such an extent that display defects associated with the arrangement are not recognized in displayed images.

Furthermore, since the vertical-conduction electrode is formed at least partially out of the same film as the pixel electrodes, by forming the vertical-conduction electrode together with the pixel electrodes in the process of manufacturing the electro-optical device, the number of steps can be reduced, so that the manufacturing process can be simplified. The "same film" herein refers to films that are formed on the same occasion in the manufacturing process and that are of the same type.

The opposing-electrode-potential line may be formed at least partially in a frame-shaped region located inside the sealing region and around the pixel region.

In this case, at least a portion of the opposing-electrode-potential line provided in the frame-shaped region functions as a light-blocking film, so that a light-blocking film can be replaced at least partially.

Furthermore, in the configuration in which the opposing-electrode-potential line is formed in the frame-shaped region around the opposing-electrode-potential line may extend into a frame-shaped region located in a portion inside a perimeter of the pixel region.

In this case, the opposing-electrode-potential line can function more effectively as a light-blocking film.

Preferably, the opposing-electrode-potential line is formed from the same film as a conductive film forming either or both lines and electronic elements that are used to drive the plurality of pixel electrodes.

In this case, by forming the opposing-electrode-potential line together with lines or electronic elements for driving the pixel electrodes, the number of steps in the manufacturing process of the electro-optical device can be reduced, so that the manufacturing process can be simplified.

In another exemplary configuration of the electro-optical device, the vertical-conduction electrode extends at least partially in a frame-shaped dummy region located around the pixel region.

In this case, on the element substrate, the dummy region is provided inside the sealing region and around the pixel region. Usually, in an electro-optical device, of a plurality of electrodes arrayed in a pixel region, compared with pixel electrodes provided in a central region of the pixel region, it is difficult to achieve favorable image display due to instable operation pixel electrodes provided in the vicinity of the periphery of the pixel region. Thus, in the pixel region, an effective region for displaying images and a frame-shaped dummy region defining the effective region along the periphery of the pixel region are provided. The pixel electrodes provided in the dummy region function as dummy pixel electrodes, which are driven similarly to the pixel electrodes provided in the effective region but do not actually contribute to image display. When the electro-optical device is driven, for example, image signals corresponding to a black level (hereinafter sometimes referred to as "black signals") are supplied to the dummy pixel electrodes, so that the dummy pixel electrode exhibit potentials corresponding to the black signals, and voltages corresponding to the potentials of the dummy pixel electrodes and the opposing electrode are applied to the electro-optical material. For example, when liquid crystal is used as the electro-optical material, the liquid crystal is AC-driven in order to prevent degradation of the liquid crystal due to application of DC components.

However, when the dummy pixel electrodes are driven with black signals as described above, since DC components are applied to the liquid crystal, the liquid crystal in the dummy region could be degraded more quickly than in the effective region. Thus, display defects could occur in displayed images due to degradation of the liquid crystal progressing from the dummy region toward the effective region.

In this configuration, the vertical-conduction electrode is provided at least partially in the dummy region on the element substrate. In this configuration, in the dummy region on the element substrate, dummy pixel electrodes may be provided in addition to the pixel electrodes arrayed in the pixel region in a portion of the dummy region while providing a portion of the vertical-conduction electrode in another portion of the dummy region. Alternatively, without providing dummy pixel electrodes, a portion of the vertical-conduction electrode may be provided substantially entirely over the dummy region.

Furthermore, on the opposing electrode, for example, the opposing electrode is disposed so as to oppose the pixel electrodes in the pixel region and so as to oppose the portion of the vertical-conduction electrode or the dummy pixel electrodes as well as the portion of the vertical-conduction electrode in the dummy region. When the electro-optical device is driven, the opposing-electrode potential is supplied to the vertical-conduction electrode, and the opposing-electrode potential is also supplied to the opposing electrode by the vertical electrical conduction via the vertical-conduction electrode and the vertical-conduction member. Thus, in the dummy region, the portion of the vertical-conduction electrode and the opposing electrode exhibit substantially the same potential, so that the liquid crystal can be AC-driven with little potential difference between these electrodes. Accordingly, the dummy pixel electrodes can be replaced by the portion of the vertical-conduction electrode provided in the dummy region. Furthermore, in the dummy region, in the portion where the vertical-conduction electrode is provided at least partially, DC components are not likely to be applied to the liquid crystal. This serves to prevent quick degradation of the liquid crystal compared with the effective region.

Thus, with this configuration, it is possible to prevent display defects due to degradation of the liquid crystal in the dummy region. Accordingly, the reliability of the electro-optical device is improved, and high-quality image display can be achieved.

Furthermore, with this configuration, for example, when peripheral circuits are provided in the peripheral region on the element substrate, since the dummy pixel electrodes are replaced by a portion of the vertical-conduction electrode, some portions of the peripheral circuits for driving the dummy pixel electrodes can be omitted compared with the case where only the dummy pixel electrodes are provided in the dummy region. Accordingly, the size of the peripheral region on the element substrate can be reduced.

In another exemplary configuration of the electro-optical device, the plurality of pixel electrodes is arrayed in a frame-shaped dummy region located in the pixel region and in an effective region other than the dummy region, wherein the pixel electrodes provided in the dummy region among the plurality of pixel electrodes function as dummy electrodes.

In this case, in the pixel region on the element substrate, pixel electrodes that are disposed in the vicinity of the periphery of the pixel region so that it is difficult to display images normally due to instable operation are caused to function as dummy pixel electrodes. Accordingly, stable and favorable image display can be achieved in the effective region.

In another exemplary configuration of the electro-optical device, a peripheral circuit that drives the plurality of pixel electrodes, the peripheral circuits being provided in the peripheral region on the element substrate, is further provided. In this case, the vertical-conduction electrode is formed so as not to overlap circuit elements of the peripheral circuit.

With this configuration, in the peripheral region on the element substrate, the vertical-conduction electrode partially overlaps the peripheral circuit when viewed in plan on the element substrate. Thus, it is possible to prevent electromagnetic effect or the like on circuit elements of the peripheral circuits.

In another exemplary configuration of the electro-optical device, the vertical-conduction member is provided in the sealing member and also functions as a gap member so that the opposing substrate and the element substrate have a predetermined gap therebetween.

With this configuration, since the vertical-conduction member is provided in the sealing member and also functions as a gap member, while providing electrical conduction in the sealing region, it is possible to control the gap between the opposing substrate and the element substrate, i.e., an "inter-substrate gap" (or simply referred to as a "gap".

Thus, with this configuration, it is possible to form the vertical conduction member in the step of applying a material for the sealing member in the process of manufacturing the electro-optical device. Accordingly, the number of steps can be reduced, and the manufacturing process can be simplified.

In another exemplary configuration of the electro-optical device, the sealing member is composed of a conductive material and also functions as the vertical-conduction member.

In this case, the sealing member is formed of, for example, a conductive paste, so as to also function as the vertical-conduction member. Thus, similarly to the case where the vertical-conduction member also functions as a gap member, it is possible to form the vertical conduction member in the step of applying a material for the sealing member in the process of manufacturing the electro-optical device. Accordingly, the number of steps can be reduced, and the manufacturing process can be simplified.

In another exemplary configuration of the electro-optical device, a plurality of external-circuit connecting terminals is provided in a projected region on the element substrate, the projected region being projected relative to the opposing substrate, and the opposing substrate is disposed so that the element substrate is projected in the projected region relative to the opposing substrate and so that a portion of the opposing substrate located on an opposite side of the projected region with respect to the pixel region is projected relative to the element substrate.

In this case, in the process of manufacturing the electro-optical device, a first large substrate including a plurality of opposing substrates and a second large substrate including a plurality of element substrates are bonded together via sealing members formed so as to bond each pair of opposing substrate and element substrate with each other. Then, the individual pairs of opposing substrate and element substrate are separated by cutting the first and second large substrates individually.

The first large substrate are disposed opposing the second large substrate so that the projected region of each element substrate on the second large substrate is projected relative to the opposing substrate. Thus, with the first and second large substrates opposing each other before cutting, opposing substrates are disposed as follows on the first large substrate. Of a pair of adjacent element substrates, one element substrate is disposed so that its projected region is projected relative to an associated opposing substrate, and the opposing substrate is disposed so that a portion thereof located on the opposite side of the projected region with respect to the pixel region is projected relative to the element substrate. Furthermore, the portion of the opposing substrate projected relative to the one element substrate overlap the projected region of the other element substrate when viewed in plan.

Thus, with this configuration, by aligning and bonding the first and second large substrates with each other, pairs of opposing substrate and element substrate can be aligned and bonded simultaneously. Accordingly, for example, compared with a manufacturing process in which individual element substrates on the second large substrate are bonded individually with opposing substrates obtained by cutting the first large substrate, the following advantages can be achieved.

With this configuration, it is not needed to provide alignment marks individually for the opposing substrates and element substrates. Furthermore, when the second large substrate is cut with the opposing substrates bonded individually with the element substrates, it is needed to provide a substantial margin in the peripheral region on the element substrate by projecting a portion of the element substrate relative to the opposing substrate. In contrast, with this configuration, by individually cutting the first and second large substrates bonded with each other, it is not needed to provide a margin for the element substrate on the second large substrate in consideration of the opposing substrate.

According, with this configuration, it is possible to reduce the size of the peripheral region on the opposing substrate or the element substrate. Furthermore, the number of steps in the process of manufacturing the electro-optical device can be reduced, and the manufacturing process can be simplified.

In another aspect of the invention, there is provided an electronic apparatus including the electro-optical device described above (including various modifications).

Since the electronic apparatus including the electro-optical device according to the invention, various electronic apparatuses that are small in size and that allow high-quality image display can be implemented, such as projection display devices, television sets, cellular phones, electronic notebooks, word processors, view-finder or monitor-direct-viewing video tape recorders, workstations, video phones, POS terminals, or touch panels. Furthermore, as an electronic apparatus according to the invention, it is possible to implement, for example, an electrophoresis device such as electronic paper, or a display device including a field emission display or a conduction electron-emitter display.

Other operations and advantages of the invention will be understood from the embodiments described below.

BRIEF DESCRIPTION OF THE DRAWINGS

The invention will be described with reference to the accompanying drawings, wherein like numbers reference like elements.

DESCRIPTION OF EXEMPLARY EMBODIMENTS

Now, embodiments of the invention will be described with reference to the drawings. The embodiments will be described below in the context of TFT active-matrix liquid crystal devices including driving circuits, as examples of electro-optical devices according to the invention.

1. First Embodiment

An electro-optical device according to a first embodiment of the invention will be described with reference to FIGS. 1 to 7.

Figure 1:
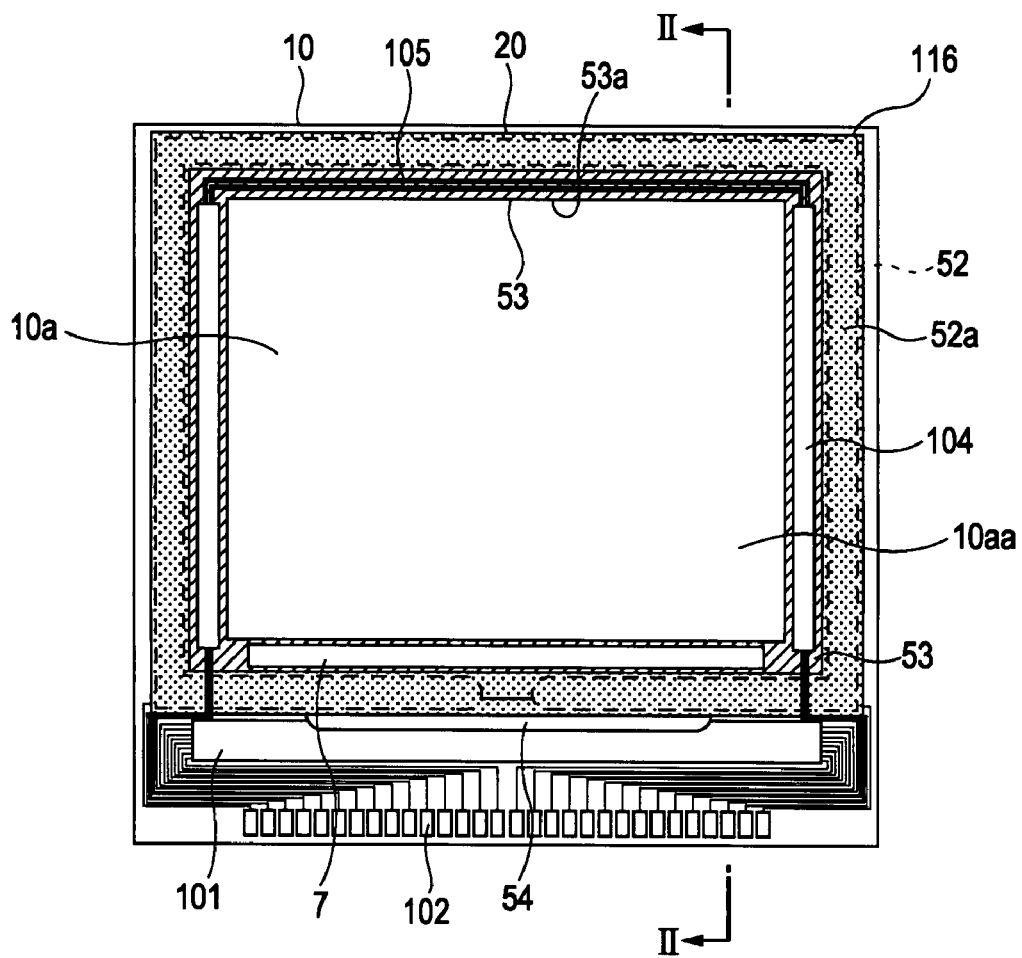
FIG. 1 is a schematic plan view of a liquid crystal device according to a first embodiment.
Figure 2:
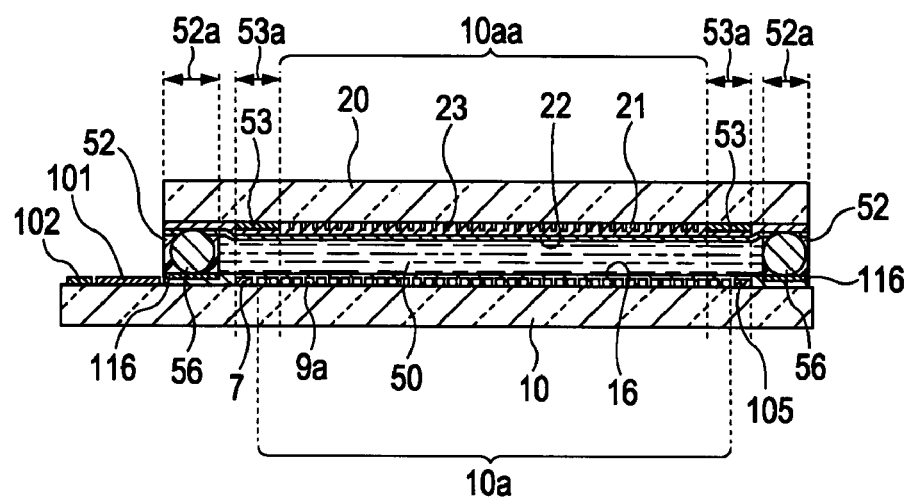
FIG. 2 is a sectional view taken along a line II-II in FIG. 1.

First, the overall configuration of the liquid crystal device according to the first embodiment will be described with reference to FIGS. 1 and 2. FIG. 1 is a schematic plan view of the liquid crystal device, in which a TFT array substrate 10, which is an example of an "element substrate" in the invention, is shown as viewed from the side of an opposing substrate, together with elements formed on the TFT array substrate 10. FIG. 2 is a sectional view taken along a line II-II in FIG. 1.

Referring to FIGS. 1 and 2, the liquid crystal device includes the TFT substrate 10 and an opposing substrate 20 opposing each other. The TFT array substrate 10 and the opposing substrate 20 are bonded to each other via a sealing member 52 provided in a sealing region 52a located around a pixel region 10a. A space defined by the sealing member 52 between the TFT array substrate 10 and the opposing substrate 20 is filled with liquid crystal 50. The liquid crystal 50 is injected into the space between the TFT array substrate 10 and the opposing substrate 20 through an opening provided in the sealing member 52. In order to prevent the liquid crystal 50 from leaking out of the space, a sealing agent 54 composed of, for example, an ultraviolet-curing acrylic resin, is applied to the opening of the sealing member 52.

Inside and along the sealing region 52a where the sealing member 52 is provided, a frame-shaped light-blocking film 53 defining a frame-shaped region 53a is provided on the opposing substrate 20. The frame-shaped region 53a overlaps a region outside the pixel region 10a and overlaps a partial region in the pixel region 10a. Alternatively, however, the frame-shaped light-blocking film 53 may be partially or entirely provided on the side of the TFT array substrate 10 as an internal light-blocking film. In this embodiment, as will be described later, the pixel region 10a includes an effective region 10aa where images are displayed, and a dummy region 10ab having a frame shape and provided along the edges of the pixel region 10a. In relation to the pixel region 10a, the frame-shaped region 53a overlaps the dummy region 10ab and defines the effective region 10aa when viewed in plan on the TFT array substrate 10.

In a peripheral region on the TFT array substrate 10, located around the pixel region 10a, peripheral circuits are provided. The "peripheral circuits" in the invention include, for example, a data-line driving circuit 101, a sampling circuit 7, scanning-line driving circuits 104, and external-circuit connecting terminals 102.

On the TFT array substrate 10, the data-line driving circuit 101 and the external-circuit connecting terminal 102 are provided along one edge of the TFT array substrate 10. Furthermore, of the peripheral region on the TFT array substrate 10, in a region inside the sealing region 52a, the sampling circuit 7 is formed so as to extend along one edge of the pixel region 10a provided along the one edge of the TFT array substrate 10 and is covered by the frame-shaped light-blocking film 53.

Furthermore, the scanning-line driving circuits 104 are provided along two edges adjacent to the above-mentioned one edge of the TFT array substrate 10 and are covered by the frame-shaped light-blocking film 53. Furthermore, in order to electrically interconnect the two scanning-line driving circuits 104 provided on either side of the pixel region 10a, a plurality of lines 105 is provided along the remaining edge of the TFT array substrate 10 and is covered by the frame-shaped light-blocking film 53.

In this embodiment, in the peripheral region on the TFT array substrate 10, either the scanning-line driving circuits 104 or the sampling circuit 7 or both the scanning-line driving circuit 104 and the sampling circuit 7 may be provided outside the sealing region 52a partially or entirely.

Furthermore, on the TFT array substrate 10, vertical conduction electrodes 116 are provided in the sealing region 52a along at least one edge of the TFT array substrate 10. In this embodiment, for example, the vertical conduction electrodes 116 are formed successively along the four edges of the TFT array substrate 10, as shown in FIG. 1.

The sealing member 52 is composed of, for example, an ultraviolet-curing resin, a thermosetting resin, or the like for bonding the TFT array substrate 10 and the opposing substrate 20 with each other. The sealing member 52 is formed by applying the material on the TFT array substrate 10 and curing the material by ultraviolet radiation, heating, or the like in the manufacturing process. In the sealing member 52, vertical conduction members 56 are dispersed. The vertical conduction members 56 are formed of, for example, gold-plated balls, and also function as gap members for adjusting the gap between the opposing substrate 20 and the TFT array substrate 10.

Referring to FIG. 2, on the TFT array substrate 10, above a layer including thin film transistors (TFTs) that serve as pixel switching elements and lines such as scanning lines and data lines, a plurality of pixel electrodes 9a is provided. Furthermore, an alignment film 16 is formed over the pixel electrodes 9a. Although the pixel switching elements are implemented by TFTs in this embodiment, alternatively, the pixel switching elements may be implemented by various other types of transistors, thin film diodes (TFDs), or the like. Alignment films 16 and 22 provided in association with the TFT array substrate 10 and the opposing substrate 20, respectively, are formed of an organic material, such as polyimide, or an inorganic material, such as silica ($SiO_2$).

In the effective region 10aa in the pixel region 10a on the opposing substrate 20, a lattice-shaped or stripe-shaped light-blocking film 23 is formed. On the light-blocking film 23 (under the light-blocking film 23 as viewed in FIG. 2), an opposing electrode 21 opposing the pixel electrodes 9a via the liquid crystal layer 50 is formed. Furthermore, an alignment film 22 is formed on the opposing electrode 21 (under the opposing electrode 21 as viewed in FIG. 2).

The liquid crystal layer 50 is composed of a single type of nematic liquid crystal or a mixture of more than one type of nematic liquid crystal. The liquid crystal layer 50 exhibits a certain orientation between the pair of alignment films 16 and 22. When the liquid crystal device is driven, voltages are applied individually to the pixel electrodes 9a and the opposing electrode 21, whereby liquid-crystal hold capacitors are formed between the pixel electrodes 9a and the opposing electrode 21.

Although not shown, on the TFT array substrate 10, in addition to the data-line driving circuit 101 and the scanning-line driving circuits 104, a testing circuit or the like for testing the quality, defects, or the like of the liquid crystal device during manufacturing or at the time of shipping may be formed.

Figure 3:
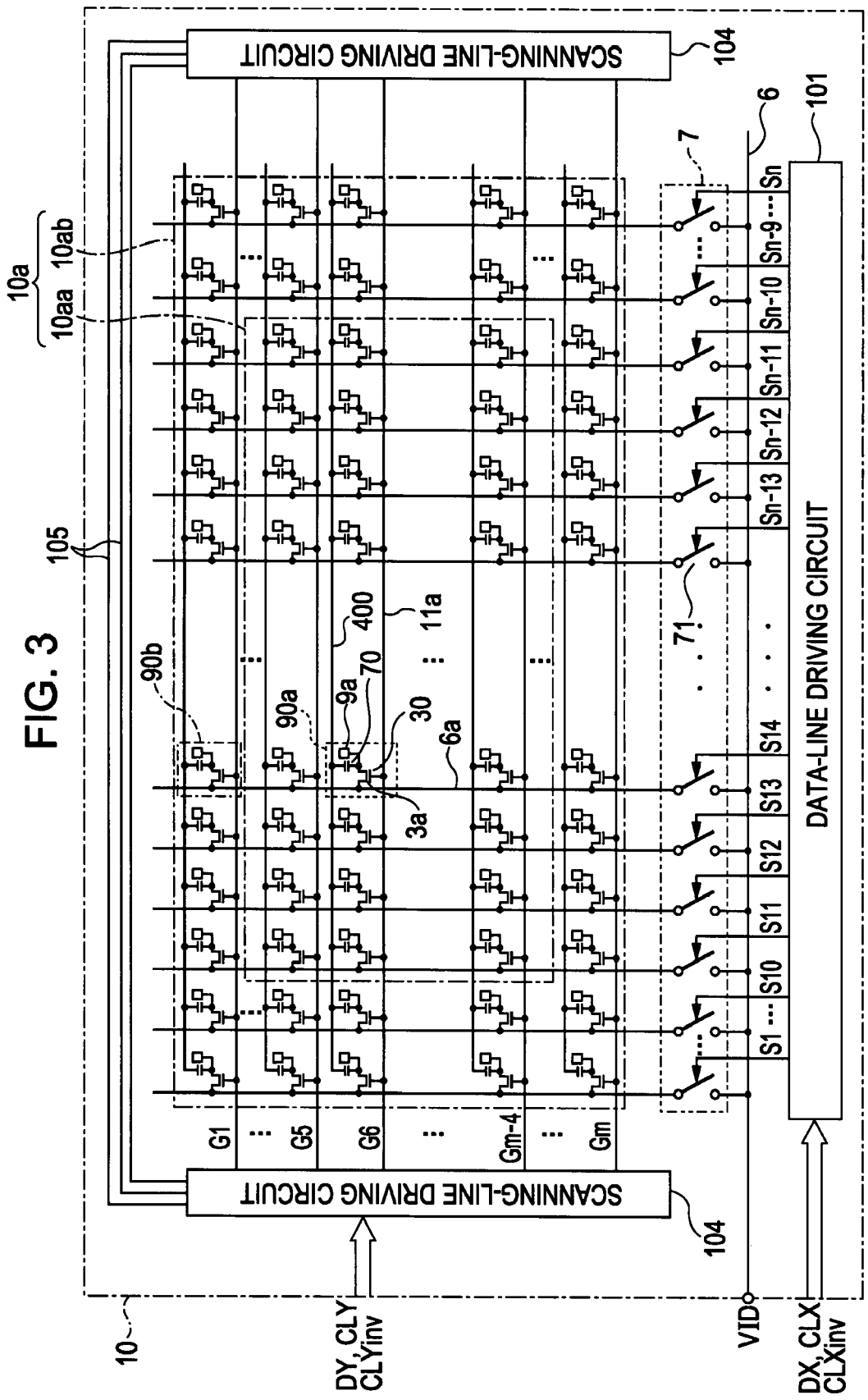
FIG. 3 is a block diagram schematically showing the configuration of a pixel region and peripheral circuits.

Next, the electrical configuration of the liquid crystal device will be described with reference to FIG. 3. FIG. 3 is a block diagram schematically showing the configuration of a pixel region and peripheral circuits.

Referring to FIG. 3, as peripheral circuits, the liquid crystal device includes the scanning-line driving circuits 104, the data-line driving circuit 101, and the sampling circuit 7, as described earlier.

The scanning-line driving circuits 104 receive a Y clock signal CLY, an inverted Y clock signal CLYinv, and a Y start pulse DY from an external circuit (not shown in FIG. 3) via an external-circuit connecting terminal 102. Upon receiving input of the Y start pulse DY, the scanning-line driving circuits 104 sequentially generate and output scanning signals G1, . . . , Gm at timings based on the Y clock signal CLY and the inverted Y clock signal CLYinv.

The data-line driving circuit 101 receives an X clock signal CLX, an inverted X clock signal CLXinv, and an X start pulse DX from an external circuit via an external-circuit connecting terminal 102. Upon receiving input of the X start pulse DX, the data-line driving circuit 101 sequentially generates and outputs sampling-circuit driving signals S1, . . . , Sn at timings based on the X clock signal CLX and the inverted X clock signal CLXinv.

The sampling circuit 7 includes a plurality of sampling switches 71 implemented by P-channel or N-channel TFTs or complementary TFTs. The sampling circuit 7 receives video signals VID, supplied to an external-circuit connecting terminal 102 from an external circuit, via a video signal line 6. In this embodiment, only one video signal line 6 is provided so that all the sampling switches 71 receive video signals VID via the video signal line 6. Alternatively, video signals may be converted from serial to parallel (i.e., expanded into phases). For example, when video signals are converted from serial to parallel into six phases of video signals VID1 to VID6, these video signals VID1 to VID6 are input to the sampling circuit 7 via six video signal lines. When parallel video signals obtained through conversion of serial video signals are simultaneously supplied to a plurality of video signal lines, video signals can be input to data lines 6a in groups, so that the driving frequency can be reduced.

The sampling circuit 7 is configured so that the individual sampling switches 71 supply video signals VID to individual data lines 6a in synchronization with the sampling-circuit driving signals S1, . . . , Sn output from the data-line driving circuit 101.

In the liquid crystal device, data lines 6a and scanning lines 11a are formed so as to extend vertically and horizontally in the pixel region 10a occupying a central region of the TFT array substrate 10. At the intersections of the data lines 6a and the scanning lines 11a, pixel portions are arranged to form a matrix. Each of the pixel portions includes a pixel electrode 9a and a TFT 30 for controlling switching of connection between the pixel electrode 9a and an associated data line 6a. In the pixel region 10a, pixel portions provided in the effective region 10aa function as effective pixel portions 90a for displaying images, and pixel portions provided in the dummy region 10ab function as dummy pixel portions 90b that are driven similarly to the effective pixel portions 90a but do not contribute to image display.

In this embodiment, the effective pixel portions 90a and the dummy pixel portions 90b are configured in the same manner. Referring to FIG. 3, regarding the configuration of an effective pixel portion 90a, the source electrode of the TFT 30 is electrically connected to an associated data line 6a, the gate electrode 3a of the TFT 30 is electrically connected to an associated scanning line 11a, and the drain electrode of the TFT 30 is electrically connected to the pixel electrode 9a. In the pixel region 10a, at each of the pixel portions, liquid crystal is held between the pixel electrode 9a and the opposing electrode 21. The pixel portions are arranged to form a matrix corresponding to the intersections of the scanning lines 11a and the data lines 6a.

According to the scanning signals G1, . . . , Gm output from the scanning-line driving circuits 104, the scanning lines 11a are sequentially selected line by line. When a scanning signal Gj (where j=1, 2, 3, . . . , m) is supplied to the TFT 30 at a pixel portion associated with a selected scanning line 11a, the TFT 30 is turned on, whereby the pixel portion is selected. At the pixel portion, the TFT 30 is switched on for a predetermined period so that video signals VID are supplied at specific timings through the data line 6a. Thus, voltages defined by the individual potentials of the pixel electrodes 9a and the opposing electrode 21 are applied to the liquid crystal.

The liquid crystal changes the orientation or order of its molecules according to the levels of voltages applied thereto, thereby modulating light to achieve multi-level display. In the normally white mode, the transmittance of incident light decreases in accordance with voltages applied to the individual pixels. On the other hand, in the normally black mode, the transmittance of incident light increases in accordance with voltages applied to the individual pixels. Thus, light having intensities corresponding to video signals VID are output from the liquid crystal device as a whole.

In this embodiment, for example, the potentials of the video signals VID alternate between positive and negative polarities with respect to a predetermined reference potential, and the video signals VID with alternating polarities are supplied from an external circuit, whereby the liquid crystal is AC-driven in the liquid crystal device. Thus, degradation of the liquid crystal due to application of a DC component can be prevented. In order to prevent leakage of video signals, a storage capacitor 70 is attached in parallel to the pixel electrode 9a. One electrode of the storage capacitor 70 is connected to the drain of the TFT 30 in parallel to the pixel electrode 9a, and the other electrode of the storage capacitor 70 is connected to a fixed-potential capacitor line 400 so that the other electrode has a fixed potential.

Furthermore, in this embodiment, referring to FIG. 3, in the dummy region 10ab, dummy pixel portions 90b are arrayed in association with four scanning lines 11a that are disposed above the pixel region 10a and through which the scanning signals G1 to G4 are supplied, four scanning lines 11a that are disposed below the pixel region 10a and through which the scanning signals Gm-3 to Gm are supplied, ten data lines 6a that are disposed on the left side of the pixel region 10a and through which video signals VID are supplied on the basis of the sampling-circuit driving signals S1 to S10, and ten data lines 6a that are disposed on the right side of the pixel region 10a and through which video signals VID are supplied on the basis of the sampling-circuit driving signals Sn-9 to Sn. The effective pixel portions 90a in the effective region 10aa are driven on the basis of video signals VID that are supplied according to the scanning signals G5 to Gm-4 and the sampling-circuit driving signals S11 to Sn-10, whereby an image is displayed.

In this embodiment, in the dummy region 10ab, for example, the dummy pixel portions 90b transmit light corresponding to black (lowest intensity) on the basis of black signals so that all the dummy pixel portions 90b exhibit the same black level. Thus, in the pixel region 10a, the periphery of an image displayed in the effective region 10aa is defined in black.

Thus, in this embodiment, pixel portions that are located in the proximity of the periphery of the pixel region 10a, with which it is difficult to display an image normally due to instable operation, are caused to function as dummy pixel portions 90b. Accordingly, images can be displayed stably and favorably in the effective region 10aa.

Figure 4:
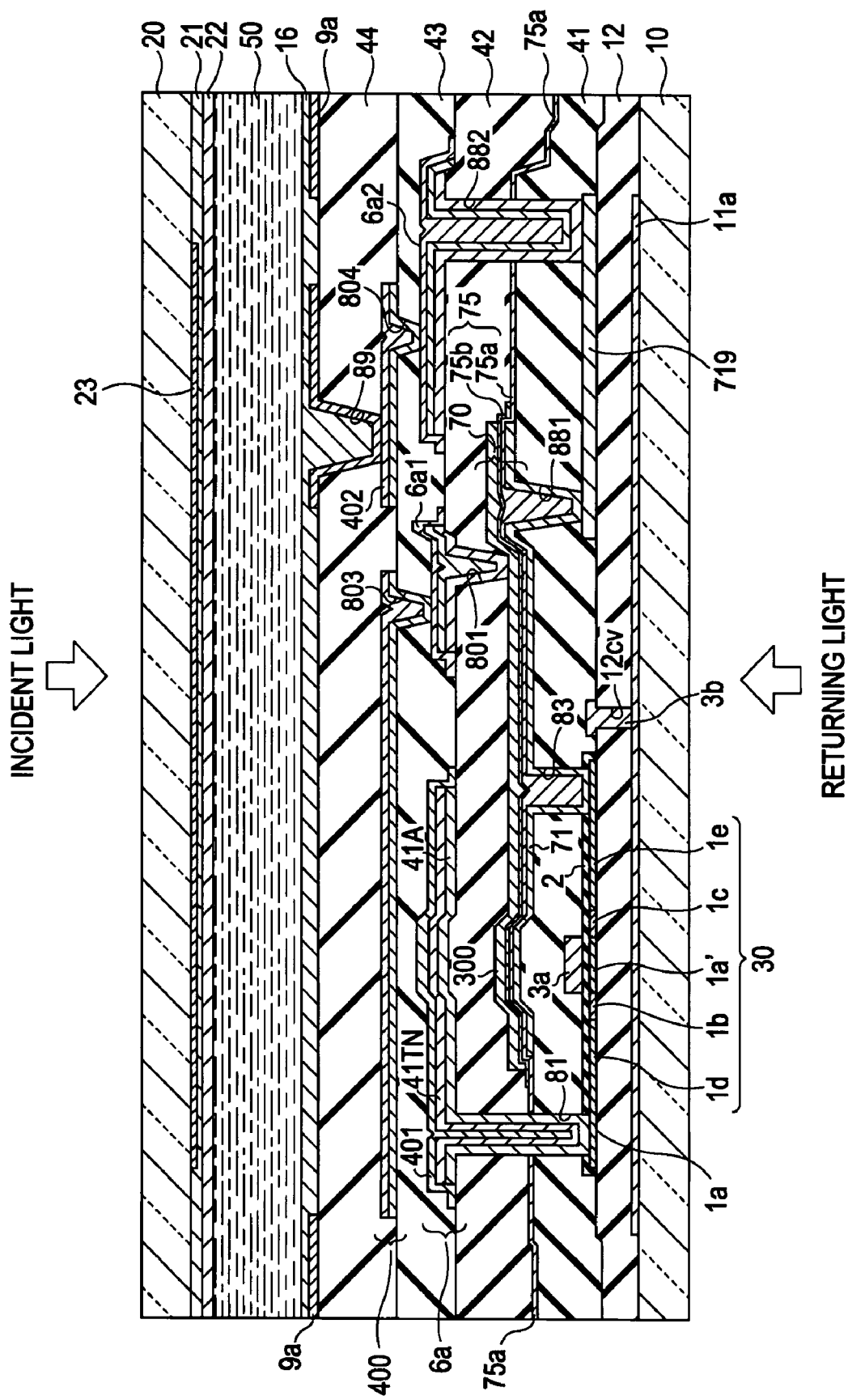
FIG. 4 is a sectional view showing the configuration of the pixel region.

Next, a specific configuration of a pixel portion for achieving the operation described with reference to FIG. 3 will be described with reference to FIG. 4. FIG. 4 is a sectional view of a pixel portion. In FIG. 4, in order to show individual layers and portions in recognizable scales, the individual layers and portions are shown in different scales. This also applies to FIG. 5 and subsequent figures. Furthermore, the scales may differ among the individual figures.

Referring to FIG. 4, the liquid crystal device includes the TFT array substrate 10 and the opposing substrate 20. The TFT array substrate 10 is, for example, a quartz substrate, a glass substrate, or a silicon substrate. The opposing substrate 20 is, for example, a glass substrate or a quartz substrate.

On the TFT array substrate 10, the pixel electrodes 9a is provided. Furthermore, over the pixel electrode 9a, the alignment film 16 that has undergone a predetermined orientation process, such as rubbing, is provided. The pixel electrode 9a is composed of a transparent conductive film, such as an indium tin oxide (ITO) film. On the other hand, on the opposing substrate 20, the opposing electrode 21 is formed over the entire surface. Furthermore, on the surface of the opposing electrode 21, the alignment film 22 that has undergone a predetermined orientation process, such as rubbing, is provided. Similarly to the pixel electrode 9a, the opposing electrode 21 is formed of a transparent conductive film, such as an ITO film.

Between the TFT array substrate 10 and the opposing substrate 20 opposing each other, an electro-optical material, such as liquid crystal, is provided in a space defined by the sealing member 52 (refer to FIGS. 1 and 2), whereby the liquid crystal layer 50 is formed. The liquid crystal layer 50 exhibits a predetermined orientation defined by the alignment films 16 and 22 when no electric field is applied by the pixel electrode 9a.

On the TFT array substrate 10, various elements including the pixel electrode 9a and the alignment film 16 are laminated in layers. The layer structure will be described below in order from the bottom.

On the TFT array substrate 10, the scanning line 11a is provided in the first layer, and a base insulating film 12 is provided above the scanning line 11a.

In the second layer, provided above the base insulating film 12, the TFT 30 including the gate electrode 3a is provided. For example, the TFT 30 has a lightly doped drain (LDD) structure, and includes a gate electrode 3a, a channel region 1a' of a semiconductor layer 1a in which a channel is formed by an electric field generated by the gate electrode 3a, an insulating film 2 including a gate insulating film that insulates the gate electrode 3a from the semiconductor layer 1a, a lightly doped source region 1b, and a lightly doped drain region 1c, a heavily doped source region 1d, and a heavily doped drain region 1e of the semiconductor layer 1a. Furthermore, in the second layer, a relaying electrode 719 is formed out of the same film as the gate electrode 3a.

The base insulating film 12 has a contact hole 12cv, and the gate electrode 3a is formed so as to fill the contact hole 12cv entirely. Thus, a side wall 3b formed integrally with the gate electrode 3a extends along the gate electrode 3a.

On the TFT array substrate 10, above the TFT 30, the gate electrode 3a, and the relaying electrode 719, a first inter-layer insulating film 41 is formed. Through the first inter-layer insulating film 41, a contact hole 81 is formed, which extends penetrating through a second inter-layer insulating film 42 described later, so that the heavily doped source region 1d and the data line 6a are electrically connected to each other. Furthermore, through the first inter-layer insulating film 41, a contact hole 83 is formed so that the heavily doped drain region 1e of the TFT 30 and the lower electrode 71 of the storage capacitor 70 are electrically connected to each other. Furthermore, through the first inter-layer insulating film 41, a contact hole 881 is formed so that the lower electrode 71 as a pixel-potential electrode of the storage capacitor 70 and the relaying electrode 719 are connected to each other. Furthermore, through the first inter-layer insulating film 41, a contact hole 882 is formed, which extends penetrating through the second inter-layer insulating film 42 described later, so that the relaying electrode 719 and a second relaying electrode 6a2 described later are electrically connected to each other.

In the third layer above the first inter-layer insulating film 41, the storage capacitor 70 is provided. The storage capacitor 70 is formed of a lower electrode 71 and a capacitor electrode 300 opposing each other via a dielectric film 75. The lower electrode 71 serves as a pixel-potential capacitor electrode connected to the heavily doped drain region 1e of the TFT 30 and the pixel electrode 9a, and the capacitor electrode 300 serves as a fixed-potential capacitor electrode.

In addition to functioning as a pixel-potential capacitor electrode, the lower electrode 70 also functions to interconnect the pixel electrode 9a and the heavily doped drain region 1e of the TFT 30. The capacitor electrode 300 is electrically connected to a capacitor line 400 at a fixed potential, which will be described later. The dielectric film 75 has, for example, a double-layer structure having a lower layer composed of a silicon oxide film 75a and an upper layer composed of a silicon nitride film 75b.

Above the storage capacitor 70, a second inter-layer insulating film 42 is formed. Through the second inter-layer insulating film 42, as described above, the contact hole 81 is formed so that the heavily doped source region 1d of the TFT 30 and the data line 6a are electrically connected to each other. Furthermore, through the second inter-layer insulating film has, a contact hole 801 is formed so that a capacitor-line relaying layer 6a1 and the capacitor electrode 300 as the upper electrode of the storage capacitor 70 are electrically connected to each other. Furthermore, through the second inter-layer insulating film 42, as described earlier, the contact hole 882 is formed so that the second relaying electrode 6a2 and the relaying electrode 719 are electrically connected to each other.

In the fourth layer above the second inter-layer insulating film 42, the data line 6a is provided. For example, the data line 6a is formed of a film having a three-layer structure including an aluminum layer (denoted by 41A in FIG. 5), a titanium nitride layer (denoted by 41TN in FIG. 5), and a silicon nitride layer (denoted by 401 in FIG. 5), in that order from the bottom. Furthermore, in the fourth layer, the capacitor-line relaying layer 6a1 and the second relaying electrode 6a2 are formed out of the same film as the data line 6a.

Above the data line 6a, a third inter-layer insulating film 43 is formed. Through the third inter-layer insulating film 43, a contact hole 803 is formed so that the capacitor line 400 and the capacitor-line relaying layer 6a1 are electrically connected to each other. Furthermore, through the third inter-layer insulating film 43, a contact hole 804 is formed so that a third relaying electrode 402 and the second relaying electrode 6a2 are electrically connected to each other.

In the fifth layer above the third inter-layer insulating film 43, the capacitor line 400 is formed, and the third relaying electrode 402 is formed out of the same film as the capacitor line 400. The third relaying electrode 402 functions electrically interconnect the second relaying electrode 6a2 and the pixel electrode 9a via contact holes 804 and 89 described later. The capacitor line 400 and the third relaying electrode 402 have a two-layer structure including an aluminum layer as a lower layer and a titanium nitride layer as an upper layer.

Lastly, in the sixth layer, the pixel electrodes 9a are arranged to form a matrix as described earlier, and the alignment film 16 is formed over the pixel electrodes 9a. Under the pixel electrodes 9a, a fourth inter-layer insulating film 44 is formed. Through the fourth inter-layer insulating film 44, a contact hole 89 is formed so that the pixel electrodes 9 and the third relaying electrode 402 are electrically connected to each other. The pixel electrode 9a and the TFT 30 are electrically connected to each other via the contact hole 89 and the third relaying layer 402 and via the contact hole 804, the second relaying layer 6a2, the contact hole 882, the relaying electrode 719, the contact hole 881, the lower electrode 71, and the contact hole 83 described earlier.

The configuration described above is common to all the pixel portions, and the pixel portions having the construction described above are provided at regular intervals in the pixel region 10a described with reference to FIGS. 1 to 3.

Figure 5:
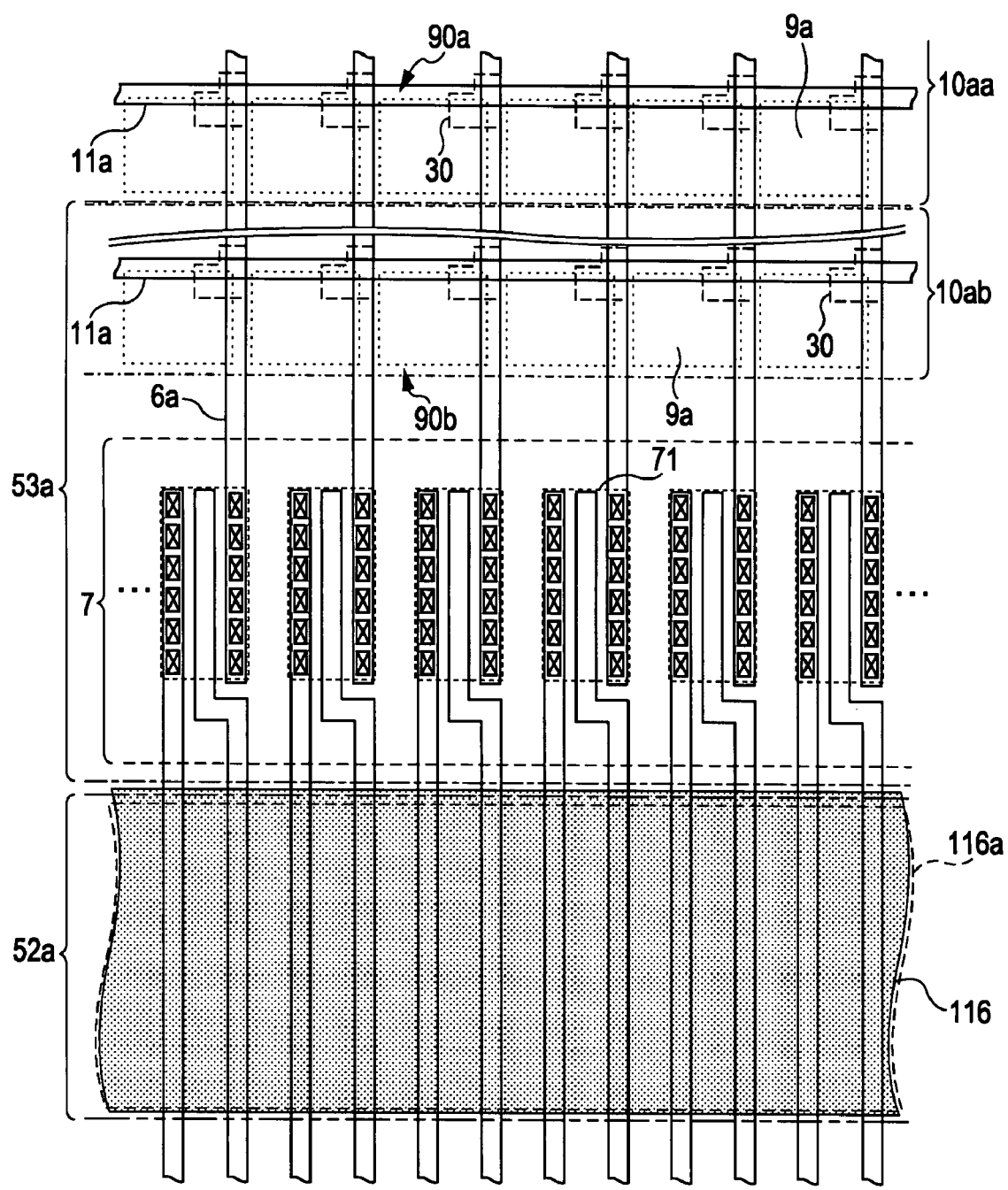
FIG. 5 is plan view schematically showing the configuration regarding vertical conduction in the first embodiment.

Next, the configuration of vertical-conduction electrodes 116 and vertical-conduction members 56 will be described in more detail with reference to FIGS. 5 and 6. FIG. 5 is a plan view schematically showing the configuration regarding vertical conduction in this embodiment, and FIG. 6 is a sectional view schematically showing the configuration regarding vertical conduction in this embodiment.

Now, with reference to FIGS. 5 and 6, a partial configuration regarding vertical conduction between the opposing substrate 20 and the TFT array substrate 10 along one edge of the TFT array substrate 10 where the sampling circuit 7 and the data-line driving circuit 101 are disposed will be described in detail. The configuration regarding vertical conduction described below applies substantially the same to portions along other edges of the TFT array substrate 10.

Figure 6:
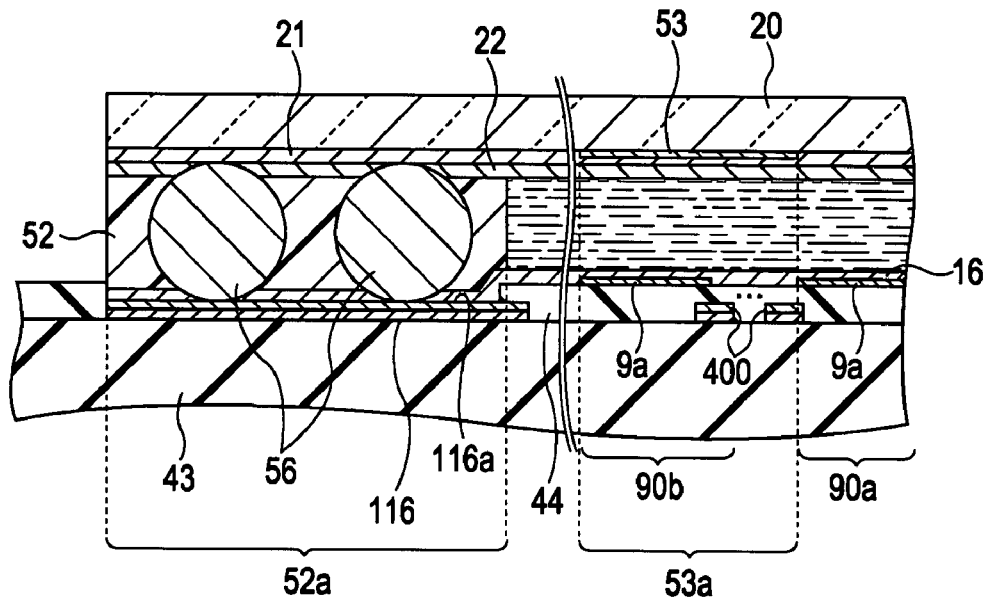
FIG. 6 is sectional view schematically showing the configuration regarding vertical conduction in the first embodiment.

Referring to FIGS. 5 and 6, as described earlier, when viewed in plan on the TFT array substrate 10, the frame-shaped region 53a overlaps the dummy region 10ab and defines the effective region 10aa. Thus, on the TFT array substrate 10, the pixel electrodes 9a and associated elements forming the dummy pixel portions 90b overlap the frame-shaped light-blocking film 53 under the frame-shaped light-blocking film 53 when viewed from the side of the opposing substrate 20. In FIGS. 5 and 6, the layout and configuration of the TFTs 30 and the data lines 6 included in pixel portions are shown schematically.

Furthermore, on the TFT array substrate 10, as described with reference to FIGS. 1 and 2, the vertical-conduction electrodes 116 are provided in the sealing region 52a, and are electrically connected to the vertical-conduction members 56 provided in the sealing member 52 to also function as gap members. In this embodiment, as shown in FIG. 6, the vertical-conduction electrodes 116 are provided above the third inter-layer insulating film 43, in the same layer as the capacitor electrodes 400 in the pixel portions described with reference to FIG. 4, and are formed out of the same film as the capacitor lines 400. Similarly to the capacitor lines 400, the vertical-conduction electrodes 116 have a two-layer structure including an aluminum layer as a lower layer and a titanium nitride layer as an upper layer. Thus, by configuring the vertical-conduction electrodes 116 to have relatively small resistances and forming the vertical-conduction electrodes 116 together with the capacitor electrodes 400 formed in the pixel region 10a in the manufacturing process of the liquid crystal device, the number of steps in the manufacturing process can be reduced, so that the manufacturing process can be simplified.

Furthermore, the vertical-conduction electrodes 116 are provided so as to surround the pixel region 10a as opposing-electrode-potential lines through which an opposing-electrode potential is supplied from an external circuit via an external-circuit connecting terminal 102. As shown in FIG. 6, the fourth inter-layer insulating film 44 is patterned so that the vertical-conduction electrodes 116 as opposing-electrode potential lines are exposed at least partially in the sealing region 52a. The portions of the opposing-electrode potential lines 116 exposed from the fourth inter-layer insulating film 44 function as vertical-conducting portions 116a that are in contact with the vertical-conduction members 56. Furthermore, the vertical-conduction members 56 are provided in contact with the opposing electrode 21 on the opposing substrate 20. Thus, when the liquid crystal device is driven, the opposing-electrode potential lines 116 are connected to the opposing electrode 21 via the vertical-conduction members 56, so that an opposing-electrode potential is supplied to the opposing electrode 21, whereby the opposing electrode 21 exhibits a predetermined potential.

In the sealing region 52a, on the vertical-conducting portions 116a or the opposing electrode 21, the alignment film 16 or 22 may be formed to extend continuously from the pixel region 10a. In this case, during manufacturing of the liquid crystal device, when the opposing substrate 20 and the TFT array substrate 10 are press-bonded via the sealing member 52, the vertical-conduction members 56 penetrate through the alignment film 16 or 22 so that the vertical conduction members 50 come in contact with the vertical-conducting portions 116a or the opposing electrode 21. If it is difficult to achieve this when the opposing substrate 20 and the TFT array substrate 10 are bonded together, the alignment film 16 or 22 is patterned in advance so that the surface of the vertical conducting portions 116a or the opposing electrode 21 is partially exposed.

Figure 7:
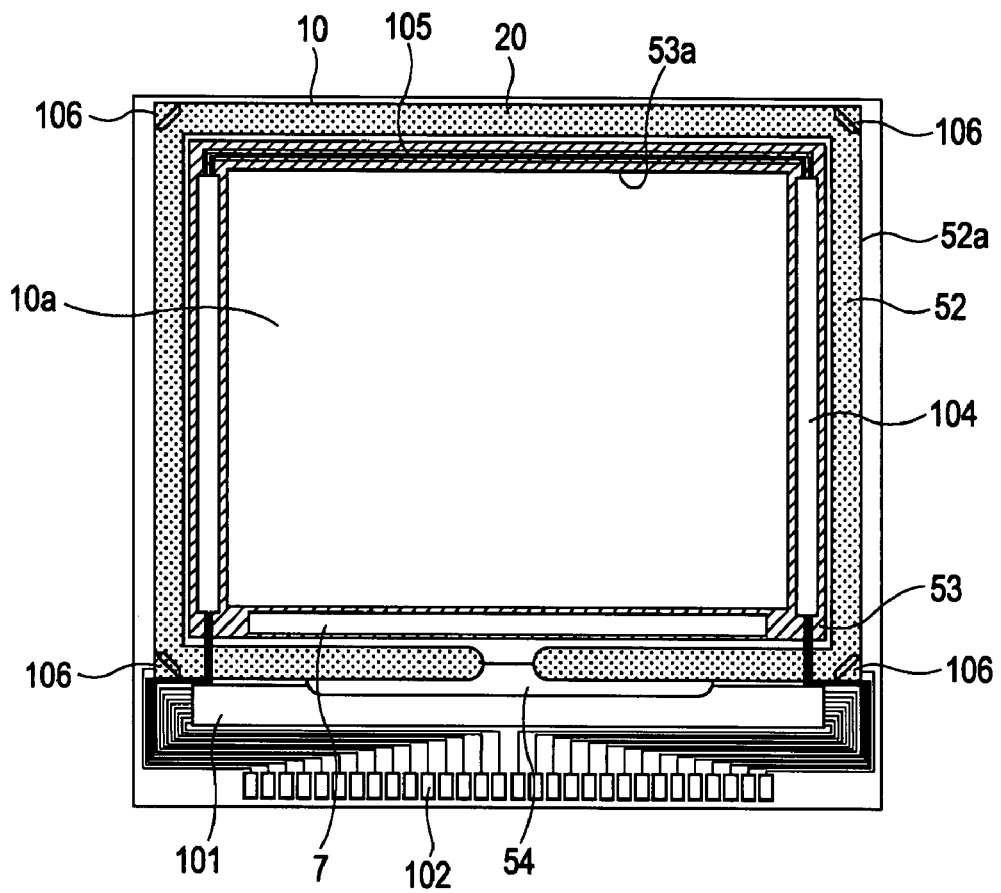
FIG. 7 is a plan view schematically showing the configuration of a liquid crystal device according to a comparative example for the first embodiment.

Now, a comparative example for this embodiment will be described with reference to FIG. 7. FIG. 7 is a plan view schematically showing the configuration of a liquid crystal device of the comparative example. Similarly to FIG. 1, FIG. 7 shows the TFT array substrate 10 together with elements formed thereon, as viewed in plan from the side of the opposing substrate 20. Regarding the configuration of the liquid crystal device of the comparative example, elements corresponding to those in the embodiment are designated by the same numerals, and description thereof are omitted when appropriate. The following description of the comparative example will be directed to points that differ from the embodiment.

Referring to FIG. 7, at the four corners of the TFT array substrate 10 and the opposing substrate 20 opposing each other, vertical-conduction terminals 106 are provided on the TFT array substrate 10, and the sealing region 52a is provided so as not to overlap the vertical-conduction terminals 106. The TFT array substrate 10 and the opposing substrate 20 are bonded together via the sealing member 52 provided in the sealing region 52a. In the sealing member 52, gap members composed of glass fiber or glass beads are dispersed. Furthermore, the vertical-conduction terminals 106 are connected to the opposing electrode 21 via vertical-conduction members provided in association with the vertical-conduction terminals 106 between the TFT array substrate 10 and the opposing substrate 20. Thus, vertical conduction between the TFT array substrate 10 and the opposing substrate 20 can be achieved. When the liquid crystal device is driven, an opposing-electrode potential is supplied to the vertical-conduction terminals 106 via an external-circuit connecting terminal 102, so that an opposing-electrode potential is supplied to the opposing electrode 21 through the vertical conduction described above.

According to the configuration described above, since the vertical conduction is provided locally in association with the positions of the vertical-conduction terminals 106, if errors from design occur in the configurations or layouts of the vertical-conduction terminals 106 or vertical-conduction members during manufacturing of the liquid crystal device, vertical conduction could be inadequate when the liquid crystal device is driven. Furthermore, in the peripheral regions on the opposing substrate 20 and the TFT array substrate 10, it is difficult to provide the sealing region 52a, the vertical-conduction terminals 106, and the vertical-conduction members in small regions at the corners on the substrates.

In contrast, according to this embodiment, in the sealing region 52a, vertical conduction between the opposing substrate 20 and the TFT array substrate 10 can be provided via the vertical-conduction members 56 along the vertical-conducting portions 116a provided along at least one edge of the TFT array substrate 10.

Thus, the elements for achieving vertical conduction between the opposing substrate 20 and the TFT array substrate 10 can be provided so as to overlap the sealing region 52a when viewed in plan on the opposing substrate 20 and the TFT array substrate 10. This serves to reduce the space needed to dispose the elements. Accordingly, the size of the peripheral region of the opposing substrate 20 or the TFT array substrate 10 can be reduced. Furthermore, it is possible to allocate spaces for disposing circuit elements and lines of peripheral circuits including the sampling circuit 7 and the data-line driving circuit 101 more effectively. That is, even if the peripheral region is reduced, larger spaces can be allocated for disposing these elements, so that design flexibility for the layout of these elements can be increased.

Furthermore, compared with the configuration of the comparative example, during manufacturing of the liquid crystal device, errors from design are less likely to occur regarding the configuration of the opposing-electrode potential lines 116 or the vertical-conduction members 56. Furthermore, even when such errors occur, considerable display defects due to inadequate vertical conduction can be prevented.

Furthermore, as shown in FIG. 1 and FIG. 5, the opposing-electrode potential line 116 are disposed in the sealing region 52a so as not to overlap circuit elements of peripheral circuits, such as the sampling switches 71 of the sampling circuit 7, when viewed in plan on the TFT array substrate 10. Thus, it is possible to prevent the portions of the opposing-electrode potential lines 116 overlapping the peripheral circuits from electromagnetically affecting the circuit elements of the peripheral circuits. In the peripheral circuits on the TFT array substrate 10, the circuit elements of the sampling circuit 7, such as the sampling switches 71, are manufactured together with the TFTs 30 and associated parts of the pixel portions and are formed in a layer below the opposing-electrode potential lines 116 in order to simplify the manufacturing process of the liquid crystal device.

Furthermore, since the vertical-conduction members 56 that also function as gap members are provided in the sealing member 52, it is possible to control gaps while achieving vertical conduction in the sealing region 52a. Thus, in the manufacturing process of the liquid crystal device, it is possible to form the vertical-conduction members 56 in the step of forming the sealing member 52. Accordingly, the number of steps in the manufacturing process can be reduced, so that the manufacturing process can be simplified. Alternatively, the sealing member 52 may be formed of conductive paste so that the sealing member 52 also functions as a vertical conduction member. Also with this configuration, it is possible to provide a vertical conduction member in the step of forming the sealing member 52.

According to the embodiment described above, it is readily possible to reduce the size of a liquid crystal device and to display images in high quality even when the size of the liquid crystal device is reduced.

Figure 8:
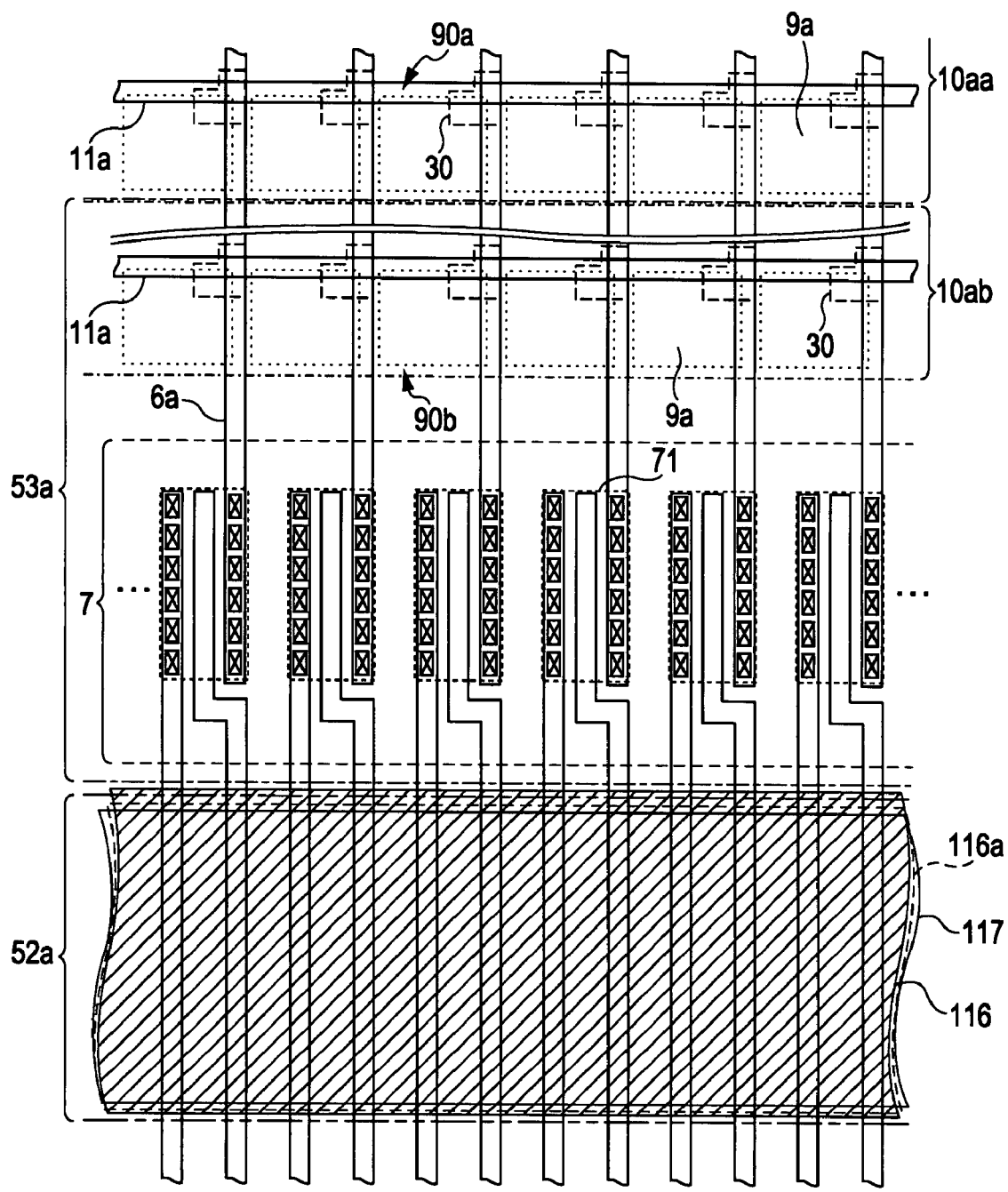
FIG. 8 is plan view schematically showing the configuration regarding vertical conduction in a modification of the first embodiment.

Next, a modification of the embodiment described above will be described with reference to FIGS. 8 and 9. FIG. 8 is a plan view schematically showing the configuration relating to vertical conduction in the modification, and FIG. 9 is a sectional view schematically showing the configuration relating to vertical conduction in the modification.

Figure 9:
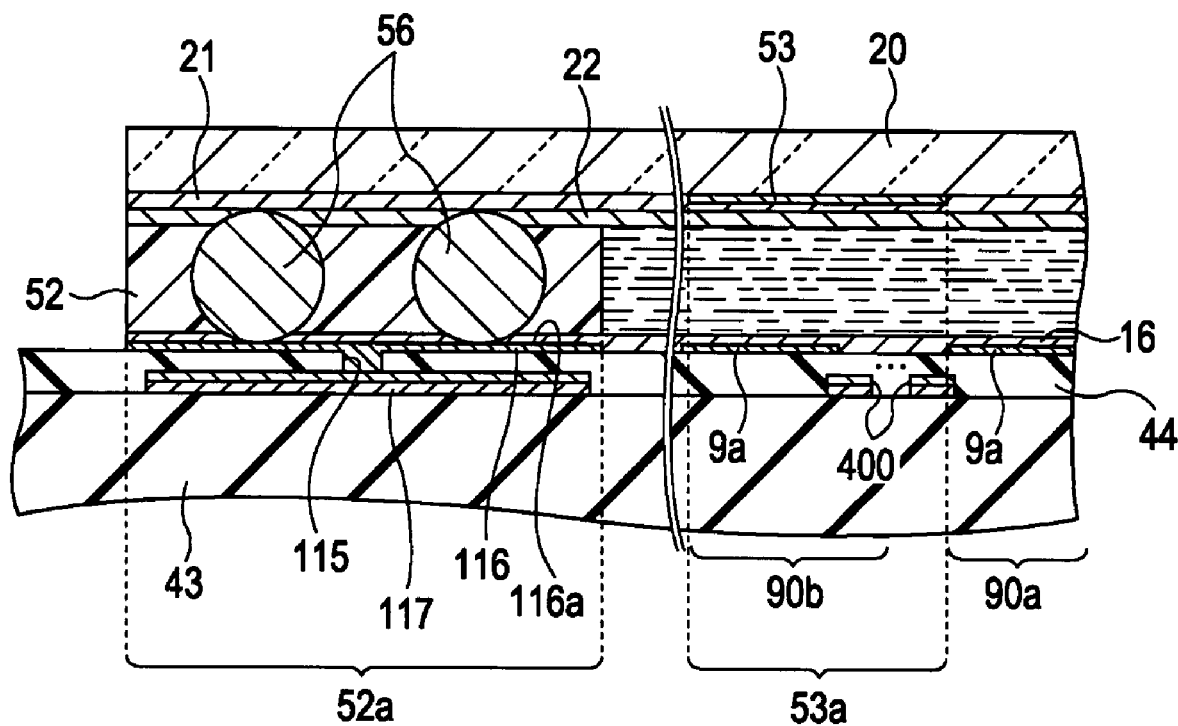
FIG. 9 is sectional view schematically showing the configuration regarding vertical conduction in the modification of the first embodiment.

Referring to FIGS. 8 and 9, in the sealing region 52a on the TFT array substrate 10, the vertical-conduction electrodes 116 are provided above the fourth inter-layer insulating film 44, in the same layer as the pixel electrodes 9a in the pixel portions, and are formed out of the same film as the pixel electrodes 9a. Of the vertical-conduction electrodes 116, portions provided in the sealing region 52a function as the vertical-conducting portions 116a that are in contact with the vertical-conduction members 56.

In addition to the vertical-conduction electrodes 116, in the sealing region 52a on the TFT array substrate 10, opposing-electrode potential lines 117 are formed so as to overlap the vertical-conduction electrodes 116 at least partially when viewed in plan. For example, the opposing-electrode potential lines 117 are provided above the third inter-layer insulating film 43, in the same layer as and out of the same film as the capacitor lines 400 in the pixel portions. The opposing-electrode potential lines 117 are electrically connected to the vertical-conduction electrodes 116 via contact holes 115 provided through the fourth inter-layer insulating film 44.

Thus, in this modification, in the manufacturing process of the liquid crystal device, the vertical-conduction electrodes 116 and the opposing-electrode potential lines 117 can be formed together with the pixel electrodes 9a in the pixel portions and the capacitor lines 400, and the contact holes 115 can be formed on the same occasion as the contact holes 89 at the pixel portions. Accordingly, the number of steps in the manufacturing process of the liquid crystal device can be reduced, so that the manufacturing process can be simplified.

In this modification, the opposing-electrode potential lines 117 may be formed of conductive films forming electronic elements such as lines other than the capacitor lines 400, such as the data lines 6a, or TFTs 30 at the pixel portions.

2. Second Embodiment

Next, an electro-optical device according to a second embodiment of the invention will be described. The electro-optical device according to the second embodiment differs from the electro-optical device according to the first embodiment particularly regarding the configuration of vertical-conduction electrodes. Regarding the second embodiment, description common to the first embodiment will be omitted, and elements corresponding to those in the first embodiment are designated by the same numerals. The following description will be directed mainly to points that differ from the first embodiment with reference to FIGS. 10 and 13, and points that are common to the first embodiment will also be described as needed with reference to FIGS. 1 to 6.

Figure 10:
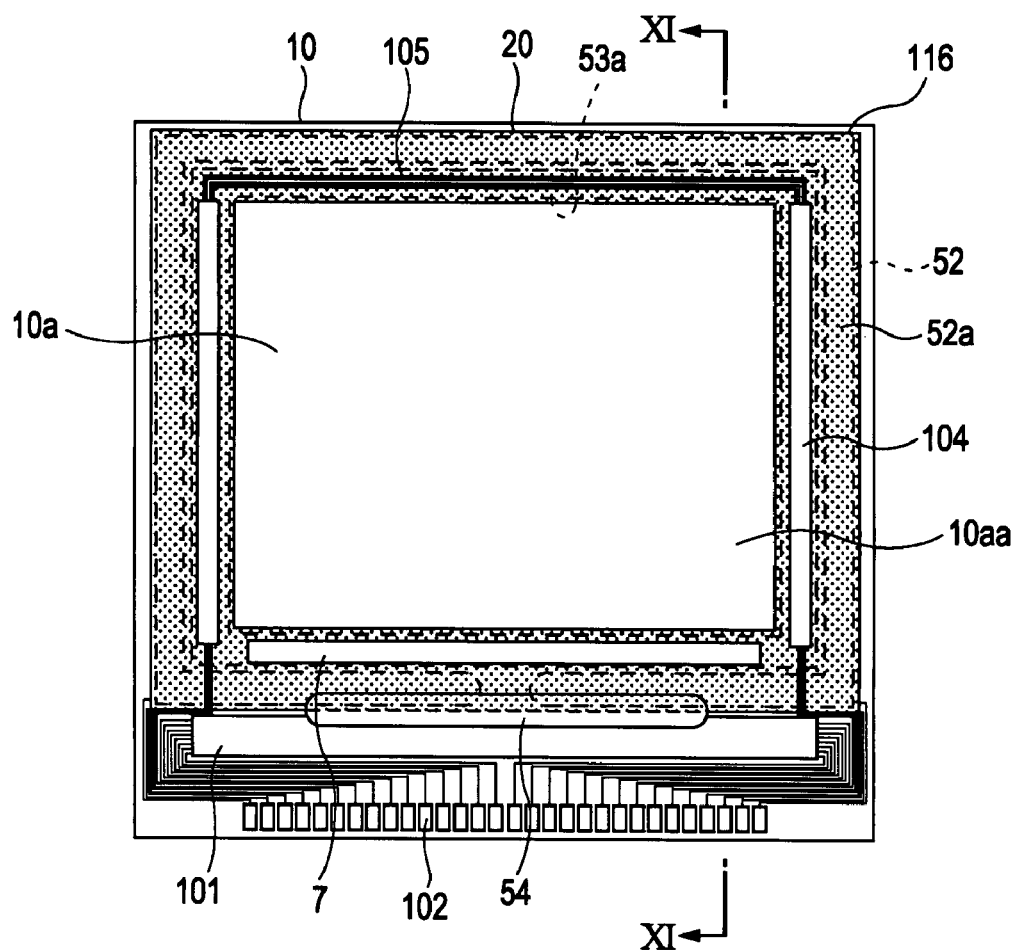
FIG. 10 is a schematic plan view of a liquid crystal device according to a second embodiment.
Figure 11:
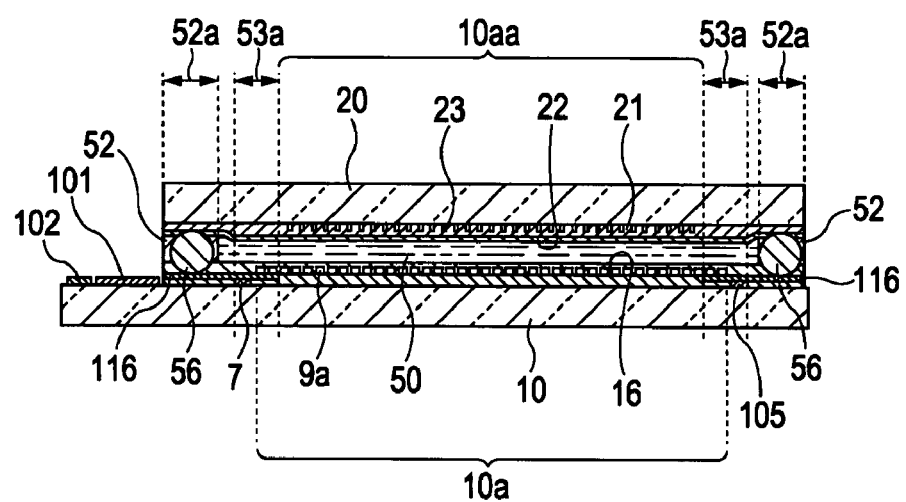
FIG. 11 is a sectional view showing the configuration of a section in the liquid crystal device according to the second embodiment, corresponding to the section shown in FIG. 2.
Figure 12:
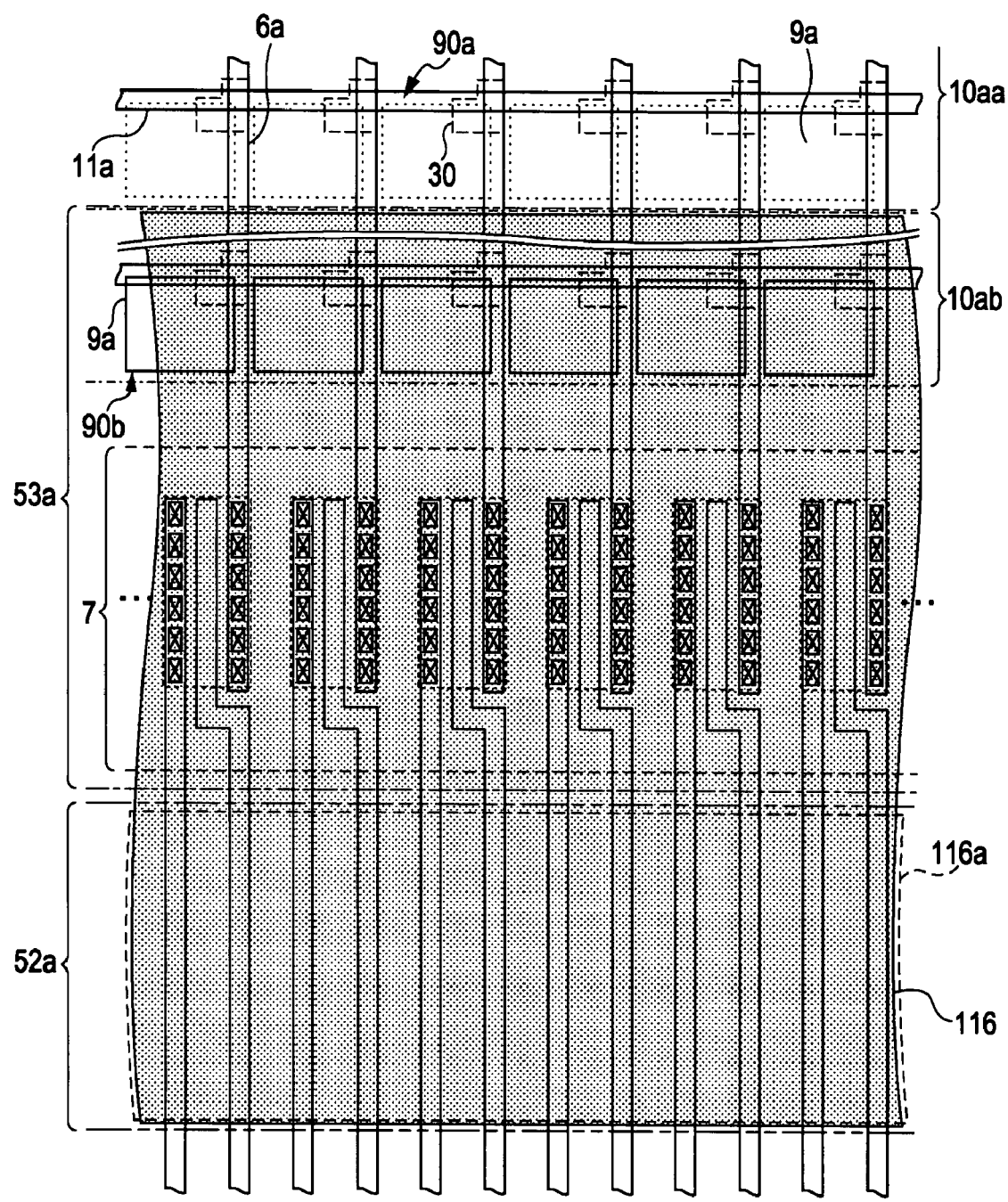
FIG. 12 is plan view schematically showing the configuration regarding vertical conduction in the second embodiment.
Figure 13:
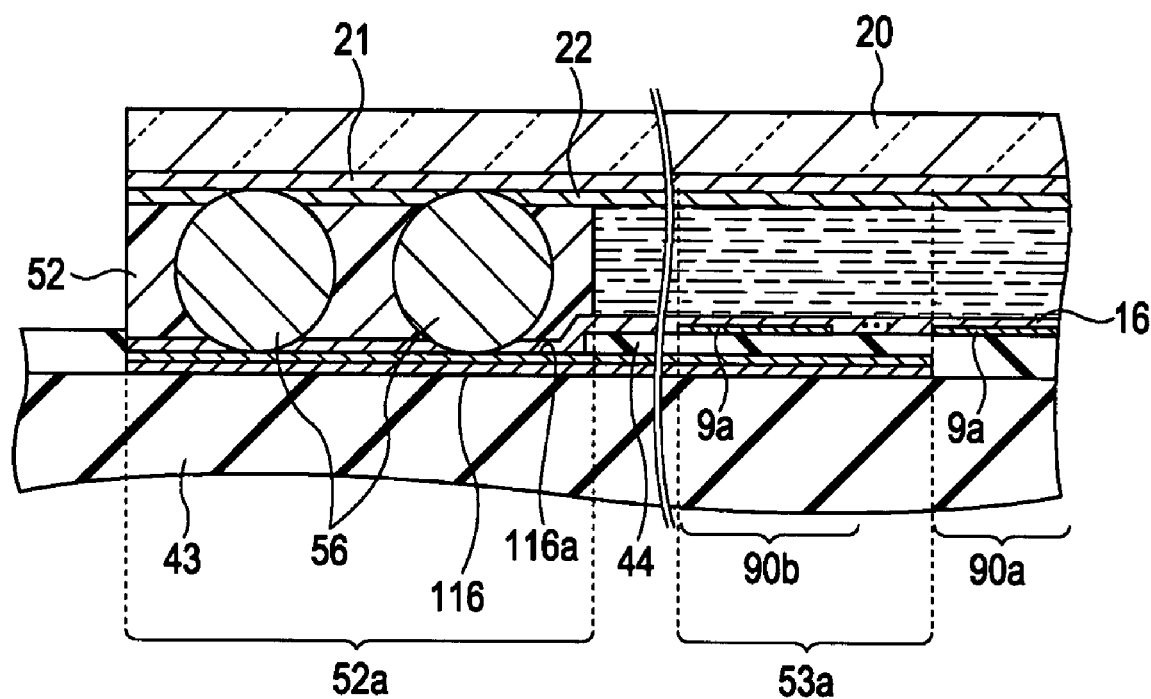
FIG. 13 is sectional view schematically showing the configuration regarding vertical conduction in the second embodiment.

FIG. 10 is a schematic plan view of the liquid crystal device according to the second embodiment, and FIG. 11 is a sectional view of the liquid crystal device according to the second embodiment, corresponding to FIG. 2 for the liquid crystal device according to the first embodiment. FIGS. 12 and 13 are a plan view and a sectional view, respectively, schematically showing the configuration relating to vertical conduction between the TFT array substrate 10 and the opposing substrate 20 in the second embodiment.

In the liquid crystal device according to the second embodiment, which is an example of an electro-optical device, as shown in FIGS. 10 and 11, the vertical-conduction electrodes 116 are formed on the TFT array substrate 10 along at least one edge of the TFT array substrate 10, some portions of the vertical-conduction electrodes 116 are disposed in the sealing region 52a, and the other portions are formed in at least part of the frame-shaped region 53a inside the sealing region 52a. Of the vertical-conduction electrodes 116, at least the portions disposed in the frame-shaped region 53a are formed of a light-blocking material. Referring to FIG. 10, for example, the vertical-conduction electrodes 116 are formed to extend from the sealing region 52a to the frame-shaped region 53a successively along the four edges of the TFT array substrate 10. Thus, the vertical-conduction electrodes 116 are arranged to form a frame shape so as to define the effective region 10aa of the pixel region 10a.

Similarly to FIGS. 5 and 6, FIGS. 12 and 13 show partial configurations relating to vertical conduction between the opposing substrate 20 and the TFT array substrate 10 along one edge of the TFT array substrate 10 where the sampling circuit 7 and the data-line driving circuit 101 are disposed. The configuration relating to vertical conduction, described below, applies substantially the same to portions along the other edges of the TFT array substrate 10.

Referring to FIG. 13, for example, the vertical-conduction electrodes 116 are formed above the third inter-layer insulating film 43, in the same layer and out of the same film as the capacitor lines 400 in the pixel portions as opposing-electrode-potential lines. Thus, the opposing-electrode-potential lines 116 are formed of a light-blocking conductive film.

Furthermore, the portions of the opposing-electrode-potential lines 116 disposed in the sealing region 52a are exposed from the fourth inter-layer insulating film 44, and the portions exposed from the fourth inter-layer insulating film 44 function as the vertical-conducting portions 116a that are in contact with the vertical-conduction members 56. Thus, also in the second embodiment, similarly to the first embodiment, in the sealing region 52a, vertical conduction between the opposing substrate 20 and the TFT array substrate 10 can be achieved via the vertical-conduction members along the vertical-conducting portions 116a provided along at least one edge of the TFT array substrate 10.

Furthermore, of the vertical-conduction electrodes 116, the portions other than the vertical-conducting portions 116a are at least partially formed continuously with the vertical-conducting portions 116a in the frame-shaped region 53a. Thus, in the second embodiment, in the vertical-conduction electrodes 116, the frame-shaped light-blocking film can be replaced at least partially by the portions provided in the frame-shaped region 53a. For example, as shown in FIGS. 10, 11, and 13, without forming the frame-shaped light-blocking film on the side of the opposing substrate 20, the frame-shaped light-blocking film can be replaced by the portions of the vertical-conduction electrodes 116 provided in the frame-shaped region 53a.

In the dummy region 10ab overlapping the frame-shaped region 53a when viewed in plan on the TFT array substrate 10, in the dummy pixel portions 90b, instead of forming the capacitor line 400 separately from the capacitor electrode 300 of the storage capacitor 70 as described with reference to FIG. 4, the capacitor electrode 300 may be formed as a part of the capacitor line 400, in a layer different from the layer of the vertical-conduction electrodes 116.

Thus, in the second embodiment, it is not needed to provide a frame-shaped light-blocking film separately from the vertical-conduction electrodes 116 in the frame-shaped region 53a on the opposing substrate 20 or the TFT array substrate 10. Thus, the number of steps in the manufacturing process of the liquid crystal device can be reduced further. Accordingly, the manufacturing process of the liquid crystal device can be simplified, so that advantages such as reduction of manufacturing cost can be achieved.

In the second embodiment, on the side of the opposing substrate 20, a frame-shaped light-blocking film may be formed partially so as to define the frame-shaped region 53a together with portions of the vertical-conduction electrodes 116 on the side of the TFT array substrate 10, or a light-blocking film may be formed separately from the portions of the vertical-conduction electrodes 116 similarly to the first embodiment.

Figure 14:
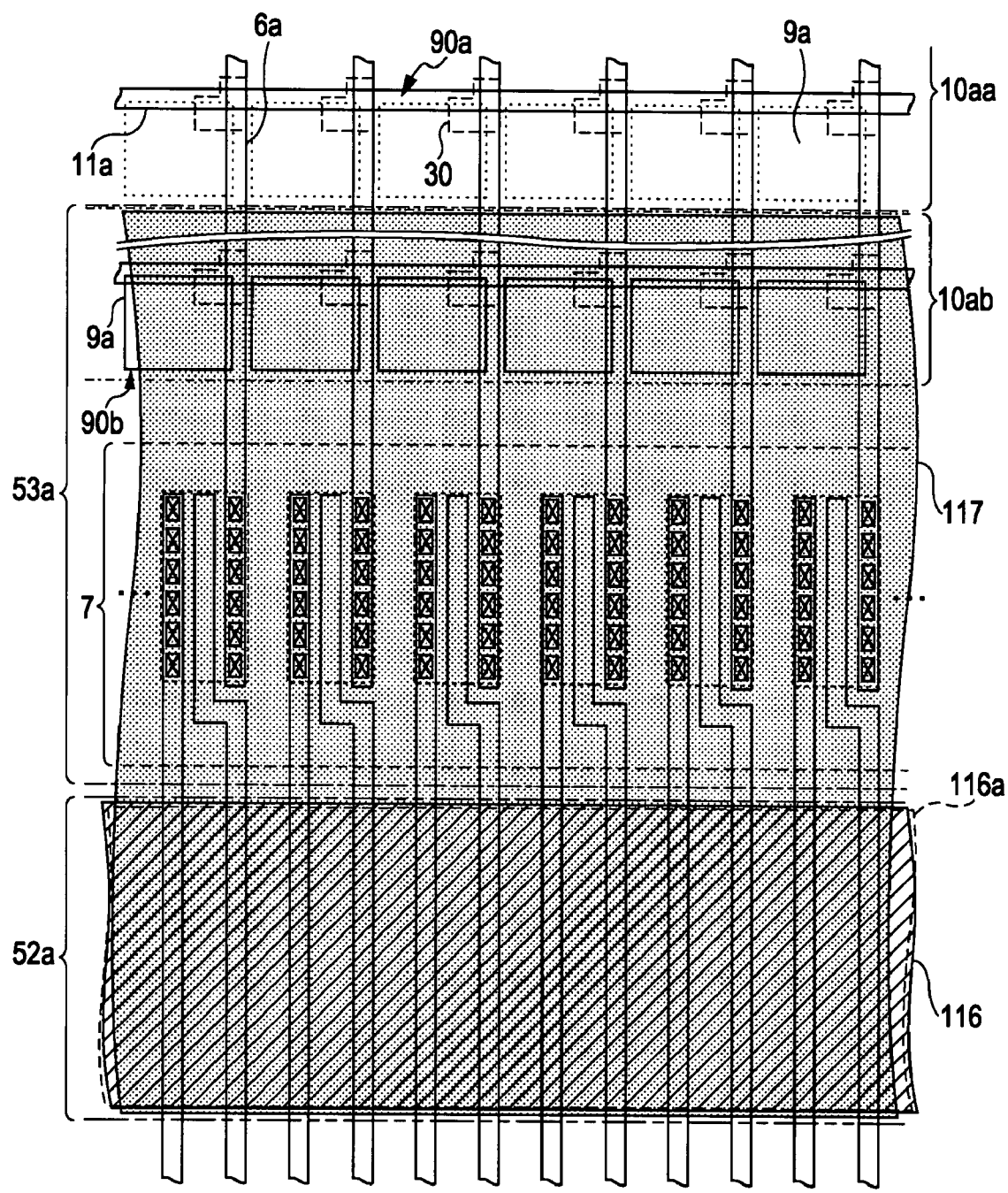
FIG. 14 is plan view schematically showing the configuration regarding vertical conduction in a modification of the second embodiment.
Figure 15:
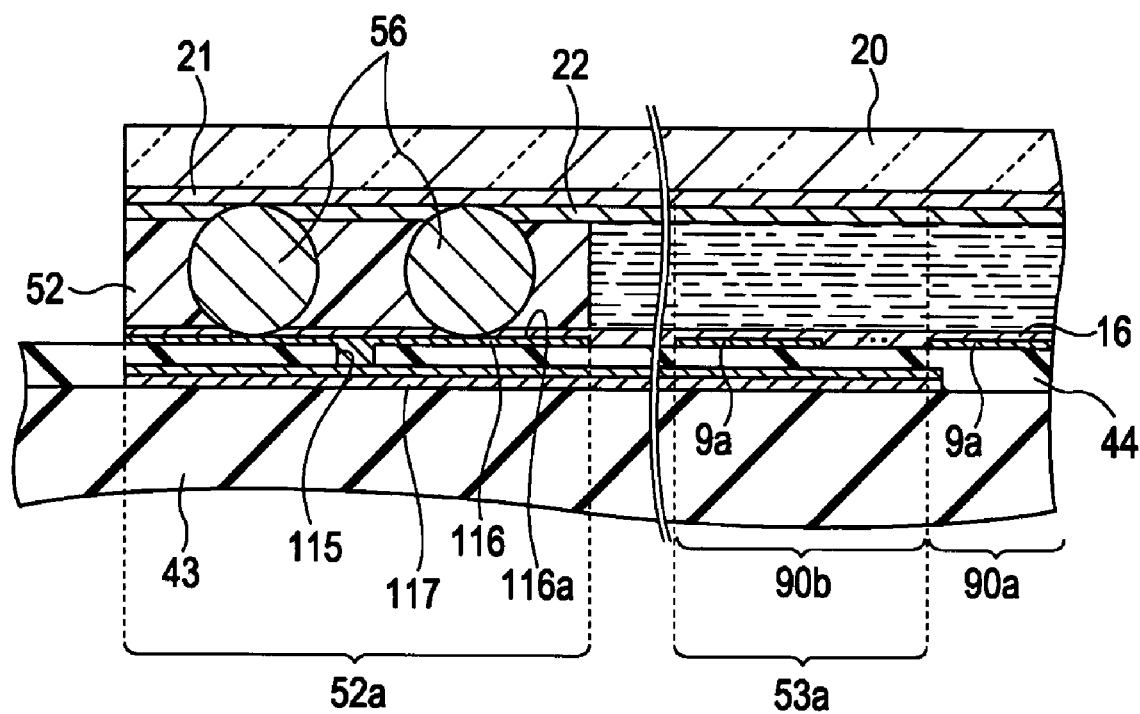
FIG. 15 is sectional view schematically showing the configuration regarding vertical conduction in the modification of the second embodiment.

Next, a modification of the second embodiment will be described with reference to FIGS. 14 and 15. FIGS. 14 and 15 are a plan view and a sectional view, respectively, schematically showing the configuration relating to vertical conduction in the modification of the second embodiment.

This modification has a configuration similar to that of the modification of the first embodiment described with reference to FIGS. 8 and 9. Thus, elements corresponding to those shown in FIGS. 8 and 9 are designated by the same numerals in FIGS. 14 and 15, and the following description will be directed to points that differ from the modification of the first embodiment, and repeated description of the corresponding elements will be omitted.

Referring to FIGS. 14 and 15, in this modification, in the sealing region 52a on the TFT array substrate 10, the vertical-conduction electrodes 116 are formed in the same layer and out of the same film as the pixel electrodes 9a, and the vertical-conduction electrodes 116 are in contact with the vertical-conduction members 56 at the vertical-conducting portions 116 provided in the sealing region 52a.

Furthermore, on the TFT array substrate 10, for example, the opposing-electrode-potential lines 117 are formed in the same layer and out of the same film as the capacitor lines 400, and are electrically connected to the vertical-conduction electrodes 116 via the contact holes 115. The opposing-electrode-potential lines 117 are partially provided in at least a partial region of the frame-shaped region 53a. For example, as shown in FIG. 14, when viewed in plan on the TFT array substrate 10, the opposing-electrode-potential lines 117 are formed so as to partially overlap the vertical-conduction electrodes 116 in the sealing region 52a and so as to extend continuously from the sealing region 52a to the frame-shaped region 53a. The opposing-electrode-potential lines 117 are arranged to form a frame shape so as to define the effective region 10aa along at least one edge of the TFT array substrate 10.

Thus, according to this modification, since the opposing-electrode-potential lines 117 are formed of a light-blocking conductive film, the frame-shaped light-blocking film can be replaced at least partially by the portions of the opposing-electrode-potential lines 117 provided in the frame-shaped region 53a. For example, without forming the frame-shaped light-blocking film on the side of the opposing substrate 20, the frame-shaped light-blocking film can be replaced by the portions of the opposing-electrode-potential lines 117 provided in the frame-shaped region, as shown in FIG. 15. Thus, according to this modification, it is not needed to form a frame-shaped light-blocking film separately from the opposing-electrode-potential line in the frame-shaped region 53a on the opposing substrate 20 or the TFT array substrate 10, so that the number of steps in the manufacturing process of the liquid crystal device can be reduced further.

Referring to FIG. 14, the vertical-conduction electrodes 116 may be formed so that the portions other than the vertical-conducting portions 116a provided in the sealing region 52a extend from the vertical-conducting portions 116a, so that the portions are formed at least partially in the frame-shaped region 53a, with the portions provided in the frame-shaped region formed of a light-blocking material. With this configuration, the frame-shaped light-blocking film can be replaced at least partially by portions of the vertical-conduction electrodes 117 in addition to the opposing-electrode-potential lines 117.

3. Third Embodiment

Next, an electro-optical device according to a third embodiment of the invention will be described. The electro-optical device according to the third embodiment differs from the electro-optical device according to the second embodiment particularly regarding the configuration of the pixel region. Regarding the third embodiment, description common to the second embodiment will be basically omitted, and elements corresponding to those in the second embodiment are designated by the same numerals. The following description will be directed mainly to points that differ from the second embodiment with reference to FIGS. 16 and 17, and points that are common to the second embodiment will also be described as needed with reference to FIGS. 1 to 13.

Figure 16:
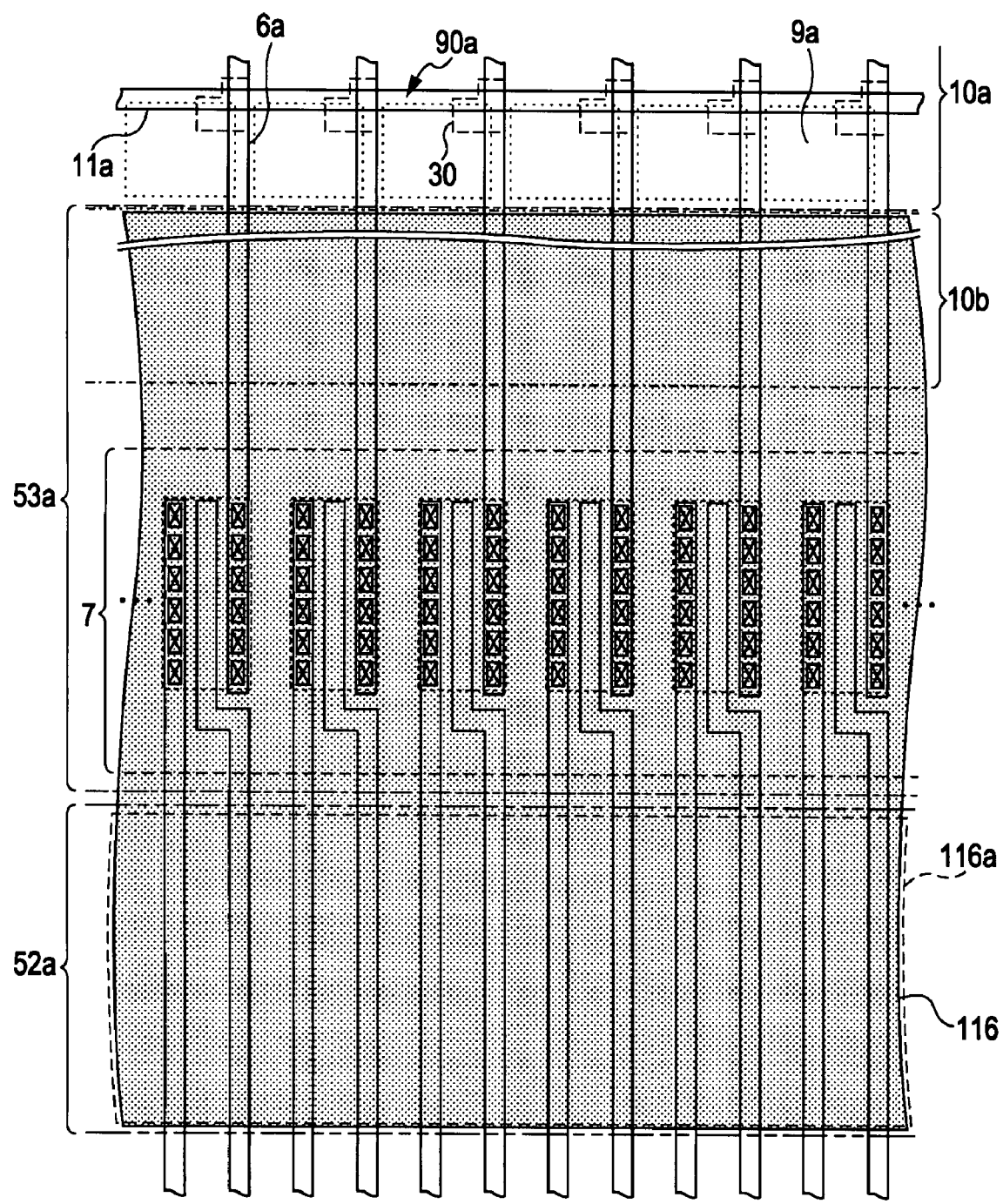
FIG. 16 is plan view schematically showing the configuration regarding vertical conduction in a third embodiment.
Figure 17:
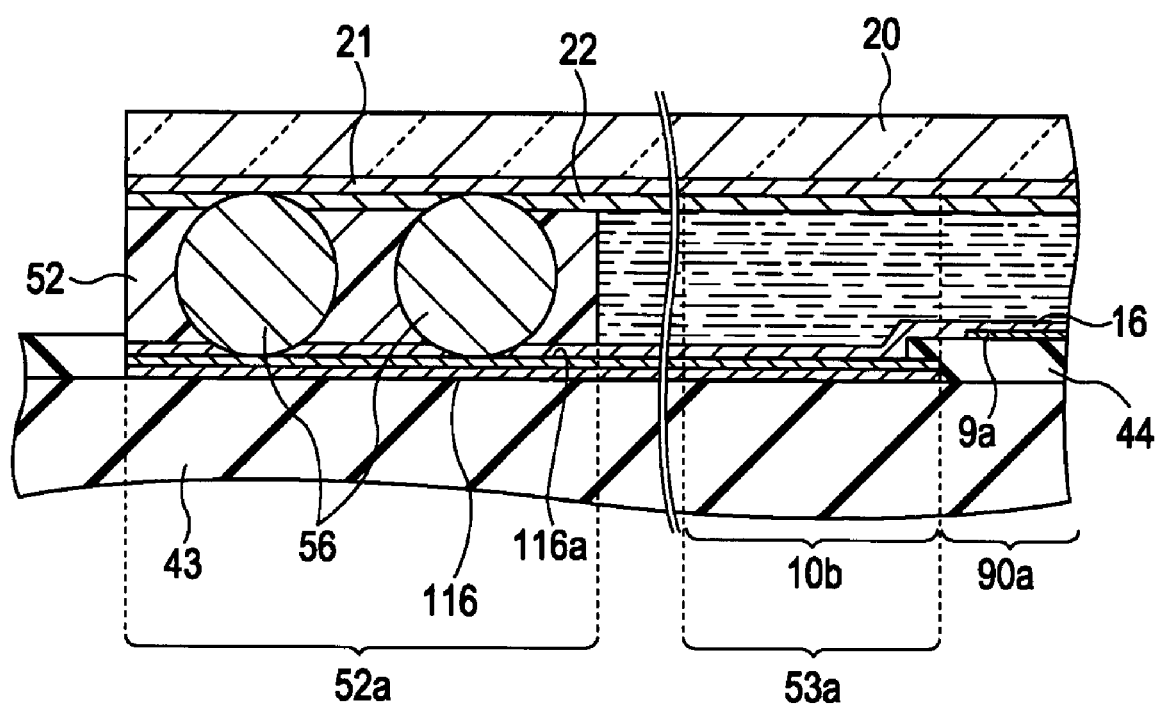
FIG. 17 is sectional view schematically showing the configuration regarding vertical conduction in the third embodiment.

FIGS. 16 and 17 are a plan view and a sectional view, respectively, schematically showing the configuration relating to vertical conduction between the TFT array substrate 10 and the opposing substrate 20 in the third embodiment. FIGS. 16 and 17 show a partial configuration relating to vertical electrical conduction between the TFT array substrate 10 and the opposing substrate 20 along the one edge of the TFT array substrate 10 where the sampling circuit 7 and the data-line driving circuit 101 are provided.

Referring to FIG. 16, in the third embodiment, the pixel region 10a is formed to function as an effective region where images are displayed, so that pixel portions arranged in the pixel region 10a function as the effective pixel portions 90a. Furthermore, a frame-shaped dummy region 10b is provided around the pixel region 10a inside the sealing region 52a. Furthermore, the frame-shaped region 53a is provided inside the sealing region 52a so as to overlap the dummy region 10b when viewed in plan on the TFT array substrate 10.

On the TFT array substrate 10, the vertical-conduction electrodes 116 are formed along at least one edge of the TFT array substrate 10, with the portions other than the vertical-conducting portions 116a at least partially formed in the frame-shaped region 53a. Referring to FIG. 17, for example, the vertical-conduction electrodes 116 are formed in the same layer and out of the same film as the capacitor lines 400 in the pixel portions as opposing-electrode-potential lines. In the sealing region 52a, the vertical-conducting portions 116a exposed from the fourth inter-layer insulating film 44 are in contact with the vertical-conduction members 56.

Of the vertical-conduction electrodes 116, the portions provided in the frame-shaped region 53a are formed in at least part of the dummy region 10b. In the dummy region 10b on the TFT array substrate 10, portions of the vertical-conduction electrodes 116 may be provided in some portions of the dummy region 10b while providing dummy pixel portions in the portions other than the portions where the portions of the vertical-conduction electrodes 116 are provided, similarly to the configuration described with reference to FIG. 3. Alternatively, for example, portions of the vertical-conduction electrodes 116 may be provided substantially in the entire dummy region 10b instead of providing such dummy pixel portions. Thus, as shown in FIGS. 16 and 17, in the dummy region 10b on the TFT array substrate 10, dummy pixel portions are not formed in the portions where portions of the vertical-conduction electrodes 116 are provided.

Furthermore, referring to FIG. 17, on the side of the opposing substrate 20, for example, the opposing electrode 21 is provided so as to oppose the pixel electrodes 9a of the pixel portions 90a in the pixel region 10a and so as to oppose portions of the vertical-conduction electrodes 116 in the dummy region 10b. When dummy pixel portions are provided in the dummy region 10b, for example, on the side of the opposing substrate 20, the opposing electrode 21 are provided so as to oppose dummy pixel electrodes provided in the dummy pixel portions as well as the portions of the vertical-conduction electrodes.

When the liquid crystal device is driven, an opposing-electrode potential is supplied to the vertical-conduction electrode 116 and to the opposing electrode 21. Thus, in the dummy region 10b, the portions of the vertical-conduction electrodes 116 and the opposing electrode 21 exhibit substantially the same potential, so that the liquid crystal can be AC-driven with little potential difference between these electrodes. Accordingly, the dummy pixel electrodes in the dummy pixel portions can be replaced by the portions of the vertical-conduction electrodes 116 provided in the dummy region 10b.

Similarly to the case described earlier in the context of the first embodiment, for example, when the dummy pixel portions are driven with black signals, since DC components are applied to the dummy pixel portions, the liquid crystal could be degraded more quickly in the dummy region 10b than in the pixel region 10a serving as the effective region.

On the other hand, in the portions of the dummy region 10b where the vertical-conduction electrodes 116 are provided at least partially, the liquid crystal is AC-driven with very small voltages, so that DC components are hardly applied to the liquid crystal. This serves to prevent relatively quick degradation of the liquid crystal. Thus, in the liquid crystal device, it is possible to prevent display defects due to degradation of the liquid crystal progressing from the dummy region 10b toward the pixel region 10a caused by degradation of the liquid crystal in the dummy region 10b. Therefore, according to the third embodiment, the reliability of the liquid crystal device is improved, and high-quality image display can be achieved.

Furthermore, compared with the first and second embodiments, in the peripheral region on the TFT array substrate 10, since the dummy pixel electrodes are replaced by portions of the vertical-conduction electrodes 116 in the dummy region 10b, some portions of the peripheral circuits including the data-line driving circuit 101 and the scanning-line driving circuits 104 can be omitted. Thus, the size of the peripheral region on the TFT array substrate 10 can be reduced further.

Figure 18:
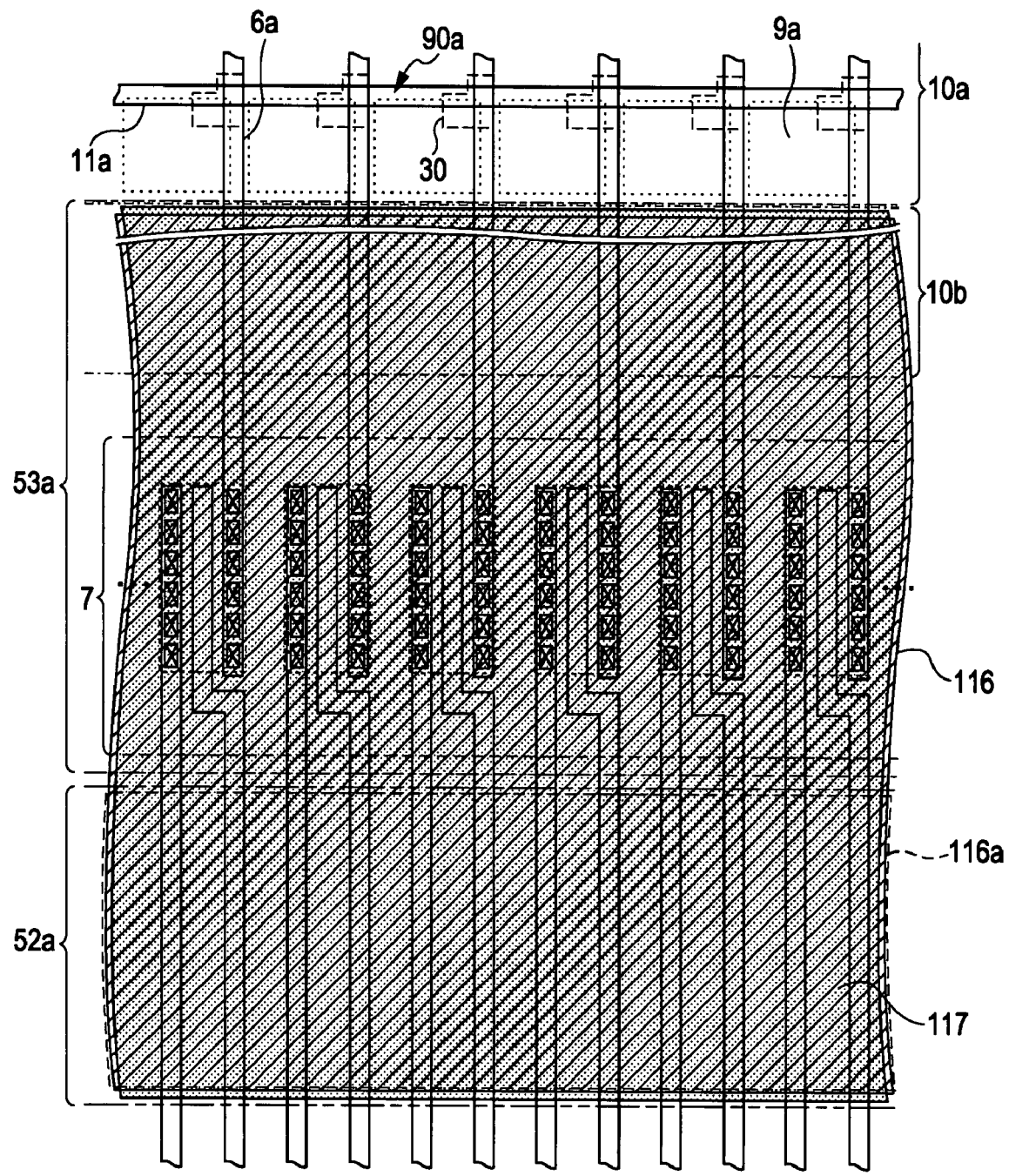
FIG. 18 is plan view schematically showing the configuration regarding vertical conduction in a modification of the third embodiment.
Figure 19:
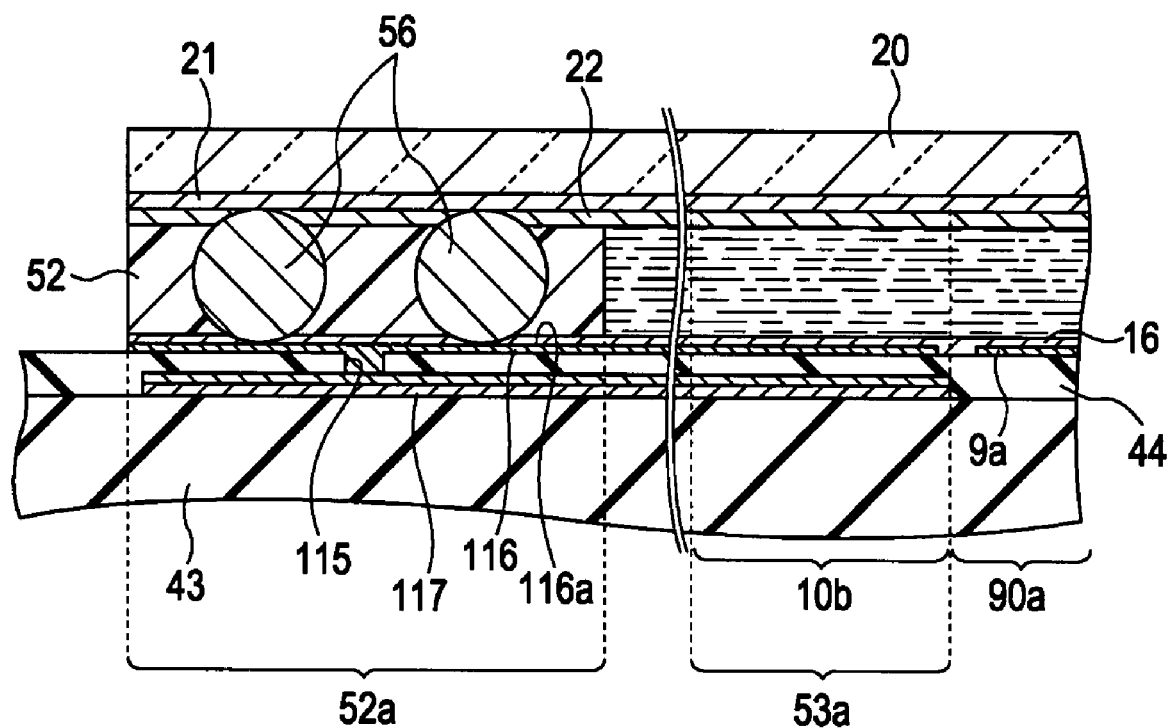
FIG. 19 is sectional view schematically showing the configuration regarding vertical conduction in the modification of the third embodiment.

Next, a modification of the third embodiment will be described with reference to FIGS. 18 and 19. FIGS. 18 and 19 are, respectively, schematically showing the configuration relating to vertical conduction in the modification of the third embodiment.

Referring to FIGS. 18 and 19, in this modification, similarly to the modification of the second embodiment described with reference to FIGS. 14 and 15, the opposing-electrode-potential lines 117 are provided in addition to the vertical-conduction electrodes 116. In the following description of this modification, the configuration corresponding to that of the modification of the second embodiment will not be described again in detail but simply described with reference to FIGS. 14 and 15 as needed.

Referring to FIGS. 18 and 19, in this modification, on the TFT array substrate 10, similarly to the modification of the second embodiment, the opposing-electrode-potential lines 117 are partially provided in at least part of the frame-shaped region 533a, and portions of the vertical-conduction electrodes 116 other than the vertical-conducting portions 116a are provided at least partially in the frame-shaped region 53a.

Of the vertical-conduction electrodes 116, the portions provided in the frame-shaped region 53a are further provided in at least part of the dummy region 10b.

Thus, also in this modification, when the liquid crystal device is driven, the dummy pixel electrodes of the dummy pixel portions are replaced by portions of the vertical-conduction electrodes in the dummy region 10b, so that the portions of the vertical-conduction electrodes 116 and the opposing electrode exhibit substantially the same potential. Accordingly, the liquid crystal can be AC-driven with little potential difference between these electrodes.

Referring to FIG. 18, when viewed in plan on the TFT array substrate 10, the portions of the vertical-conduction electrodes 116 and the opposing-electrode-potential lines 117 overlap some circuit elements of the peripheral circuits provided in the frame-shaped region 53a, such as the sampling switches 71 of the sampling circuit 7. As described with reference to FIGS. 14 and 15, it is possible to replace the frame-shaped light-blocking film at least partially by providing portions of the opposing-electrode-potential lines 117 in the frame-shaped region 53a. However, for example, when portions of the opposing-electrode-potential lines 117 are disposed so as to overlap the sampling switches 71, the quality of image display in the pixel region 10a could be degraded by electromagnetic effect or the like. This applies similarly, for example, to the configuration described with reference to FIGS. 16 and 17.

Thus, for example, in order to prevent such degradation of the quality of image display, in the configuration described with reference to FIGS. 18 and 19, preferably, the opposing-electrode-potential lines 117 are disposed so as not to overlap the circuit elements of the peripheral circuits, such as the sampling switches 71, on the TFT array substrate 10. In this case, the vertical-conduction electrodes 116 are provided in a layer above the opposing-electrode-potential lines 117 on the TFT array substrate 10. Thus, the portions of the vertical-conduction electrodes 116 provided in the frame-shaped region 53a overlap the circuit elements of the peripheral circuits when viewed in plan, so that the electromagnetic effect or the like on the circuit elements can be reduced compared with the case where the portions of the opposing-electrode-potential lines 117 overlap the circuit elements. Accordingly, the effect on the circuit elements due to the arrangement in which the portions of the vertical-conduction electrodes 116 provided in the frame-shaped region 53a overlap the circuit elements of the peripheral circuits when viewed in plan can be reduced to such an extent that display defects caused by the arrangement will not be recognized in displayed images.

4. Fourth Embodiment

Next, an electro-optical device according to a fourth embodiment of the invention will be described. The electro-optical device according to the fourth embodiment differs from the electro-optical devices according to the first to third embodiments regarding the positional relationship between the opposing substrate and the TFT array substrate and the composition of the sealing member. Regarding the fourth embodiment, description common to the first to third embodiments will be basically omitted, and elements corresponding to those in the first to third embodiments are designated by the same numerals. The following description will be directed mainly to points that differ from the first to third embodiments with reference to FIGS. 20 to 22, and points that are common to the first to third embodiments will also be described as needed with reference to FIGS. 1 to 19.

Figure 20:
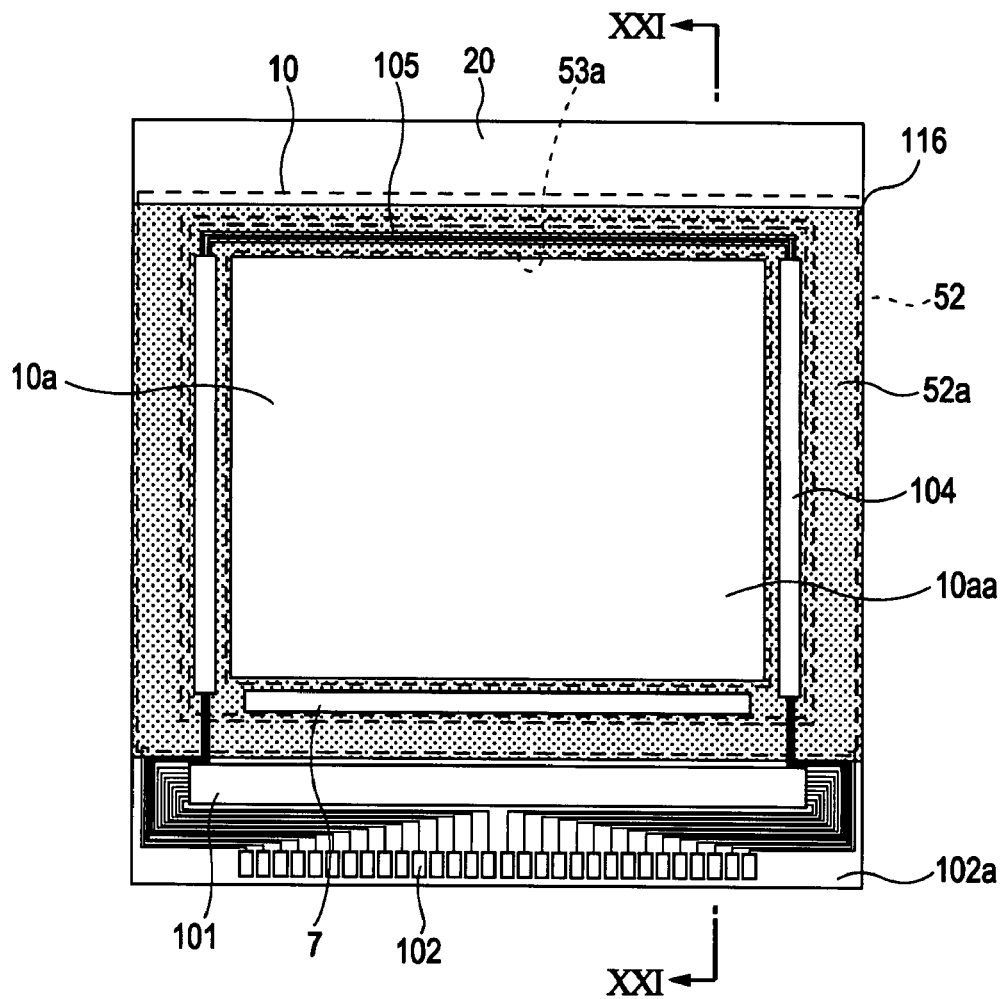
FIG. 20 is a schematic plan view of a liquid crystal device according to a fourth embodiment.

Now, the configuration of the liquid crystal device according to the fourth embodiment will be described with reference to FIGS. 20 and 21. FIG. 20 is a schematic plan view of the liquid crystal device according to the fourth embodiment, and FIG. 21 is a sectional view showing the section of the liquid crystal device according to the fourth embodiment, corresponding to the section shown in FIG. 2.

Figure 21:
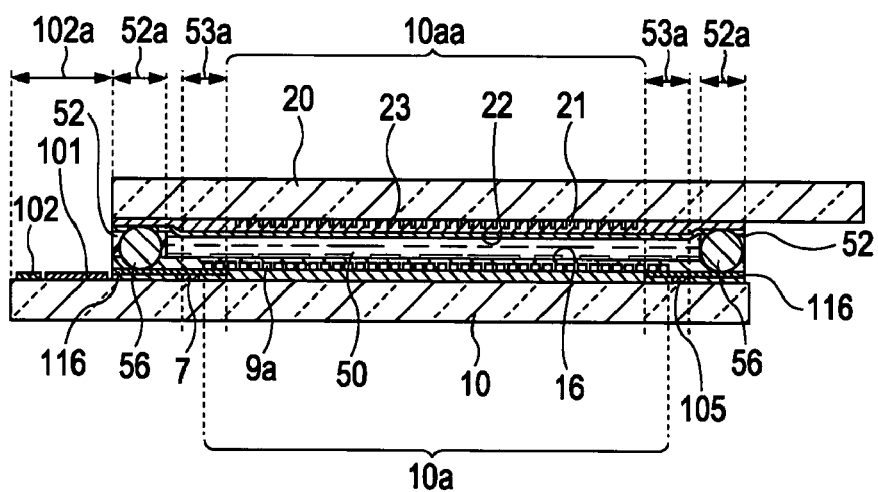
FIG. 21 is a sectional view showing a section in the liquid crystal device according to the fourth embodiment, corresponding to the section shown in FIG. 2.

Referring to FIGS. 20 and 21, according to the fourth embodiment, the liquid crystal device is manufactured by a manufacturing method described later. In the liquid crystal device, the TFT array substrate 10 is projected relative to the opposing substrate 20 in a projected region 102a. Furthermore, on the opposing substrate 20, a portion on the opposite side of the projected region 102a with respect to the pixel region 10a is projected relative to the TFT array substrate 10. In the peripheral region on the TFT array substrate 10, the external-circuit connecting terminals 102 are provided in the projected portion 102a.

Furthermore, in the liquid crystal device manufactured by the manufacturing method described later, the sealing member 52 does not have an opening for injecting liquid crystal, so that the sealing agent 54 is not applied. In this case, the sealing member 52 is provided continuously in the sealing region 52a around the pixel region 10a. Although FIGS. 20 and 21 shows the configuration of the liquid crystal device similar to the second embodiment, the features of the fourth embodiment can be applied to any of the first to third embodiments.

Figure 22A:
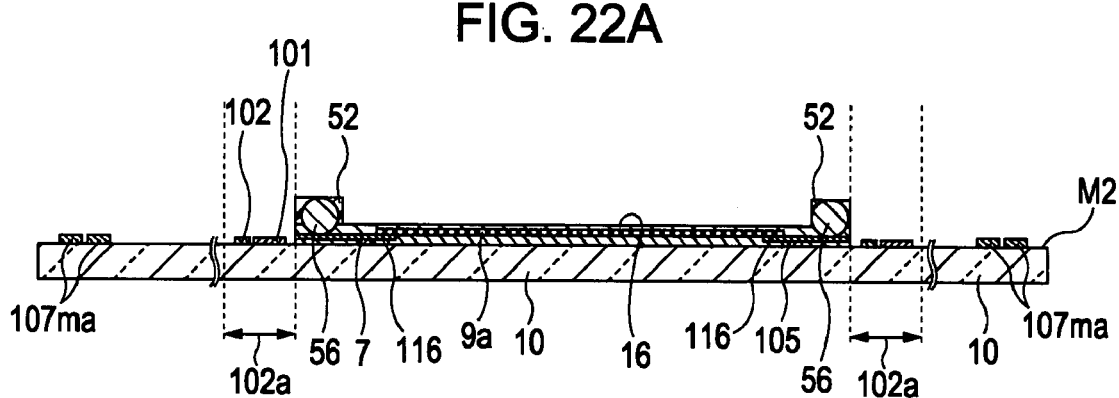
FIGS. 22A to 22C are process charts showing the configuration of the section in the liquid crystal device on a large substrate, corresponding to the section shown in FIG. 21, in individual steps of a manufacturing process in order.
Figure 22B:
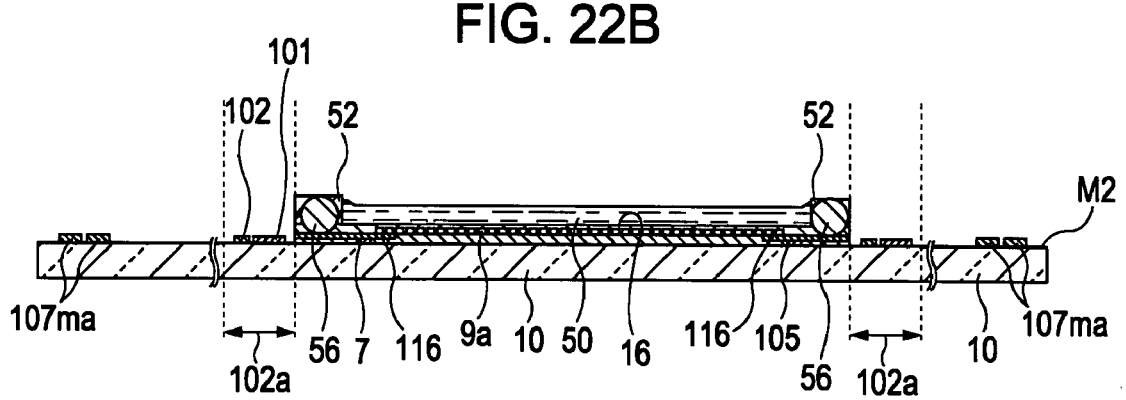
Figure 22C:
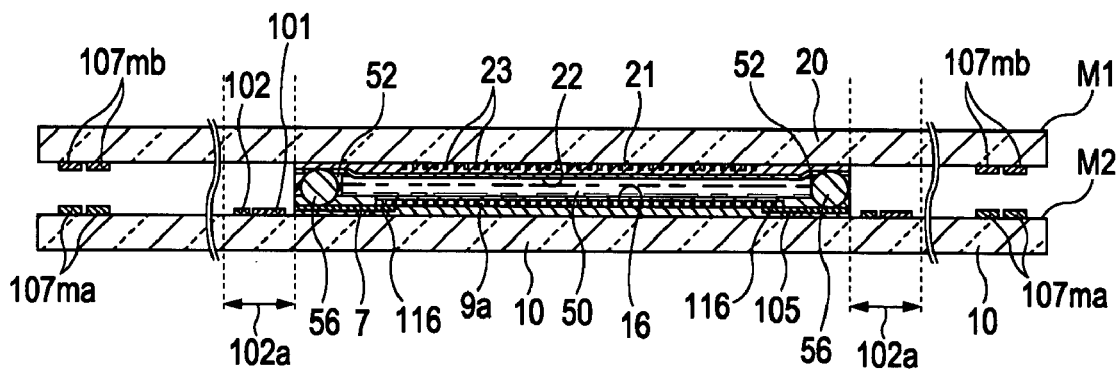

Next, a method of manufacturing the liquid crystal device according to the fourth embodiment will be described with reference to FIGS. 22A to 22C. FIGS. 22A to 22C are process diagrams showing the configuration of the section of the liquid crystal device corresponding to the section shown in FIG. 21, in individual steps of the manufacturing process in order.

The following description will be directed mainly to manufacturing steps relating to bonding of the opposing substrate 20 and the TFT array substrate 10 according to the fourth embodiment, and detailed description will be omitted regarding manufacturing steps of the scanning lines 11a, the data lines 6a, the TFTs 30, and the like in the lamination structure on the side of the TFT array substrate 10 and manufacturing steps of the light-blocking film 23, the opposing electrode 21, and the like on the side of the opposing substrate 20.

According to the fourth embodiment, the liquid crystal device is manufactured using a one-drop-full (ODF) manufacturing method by bonding together a first large substrate M1 including a plurality of the opposing substrates 20 and a large substrate M2 including a plurality of the TFT array substrates 10.

Referring first to FIG. 22A, on each TFT array substrate 10 on the second large substrate M2, various elements described with reference to FIGS. 1 to 4 (the vertical-conduction electrodes 116, the TFTs 30, the scanning lines 11a, the data lines 6a, the scanning-line driving circuits 104, the data-line driving circuit 101, etc.) are formed, and the alignment film 16 is formed in a layer above the pixel electrodes 9a. Then, for each TFT array substrate 10, the sealing member 52 is formed in the sealing region 52a by applying a sealing material including the vertical-conduction members 56 by a dispenser or the like. On the second large substrate M2, at the ends where the TFT array substrates 10 are not provided, alignment marks 107ma for alignment with the first large substrate M1 are provided.

Referring next to FIG. 22B, on the TFT array substrate 10, liquid crystal is dropped in the region defined by the sealing member 52, whereby the liquid crystal layer 50 is formed.

Referring next to FIG. 22C, on each opposing substrate 20 on the first large substrate M1, the light-blocking film 23, the opposing electrode 21, and so forth are formed, and the alignment film 22 is formed. Then, the first large substrate M1 and the second large substrate are disposed so as to oppose each other and are bonded with each other by curing the sealing member 52 while adjusting the gap to a predetermined value for each pair of the opposing substrate 20 and the TFT array substrate 10.

On the first large substrate M1, alignment marks 107mb are provided correspondingly to the positions of the alignment marks 107ma on the second large substrate M2. On the basis of the alignment marks 107ma and 107mb, the first large substrate M1 and the second large substrate M2 are disposed so as to oppose each other. In this state, one of a pair of adjacent TFT array substrates 10 on the second large substrate M2 is disposed so as to project in the projected region 102a relative to an associated opposing substrate 20 on the first large substrate M1. Furthermore, the opposing substrate 20 is projected relative to the TFT array substrate 10 at a portion on the opposite side of the projected region 102a with respect to the pixel region 10a, so that the projected portion overlap the projected region 102a of the other TFT array substrate 10 when viewed in plan.

Then, the first large substrate M1 and the second large substrate M2 are cut into individual pairs of the opposing substrate 20 and the TFT array substrate 10.

Figure 23A:
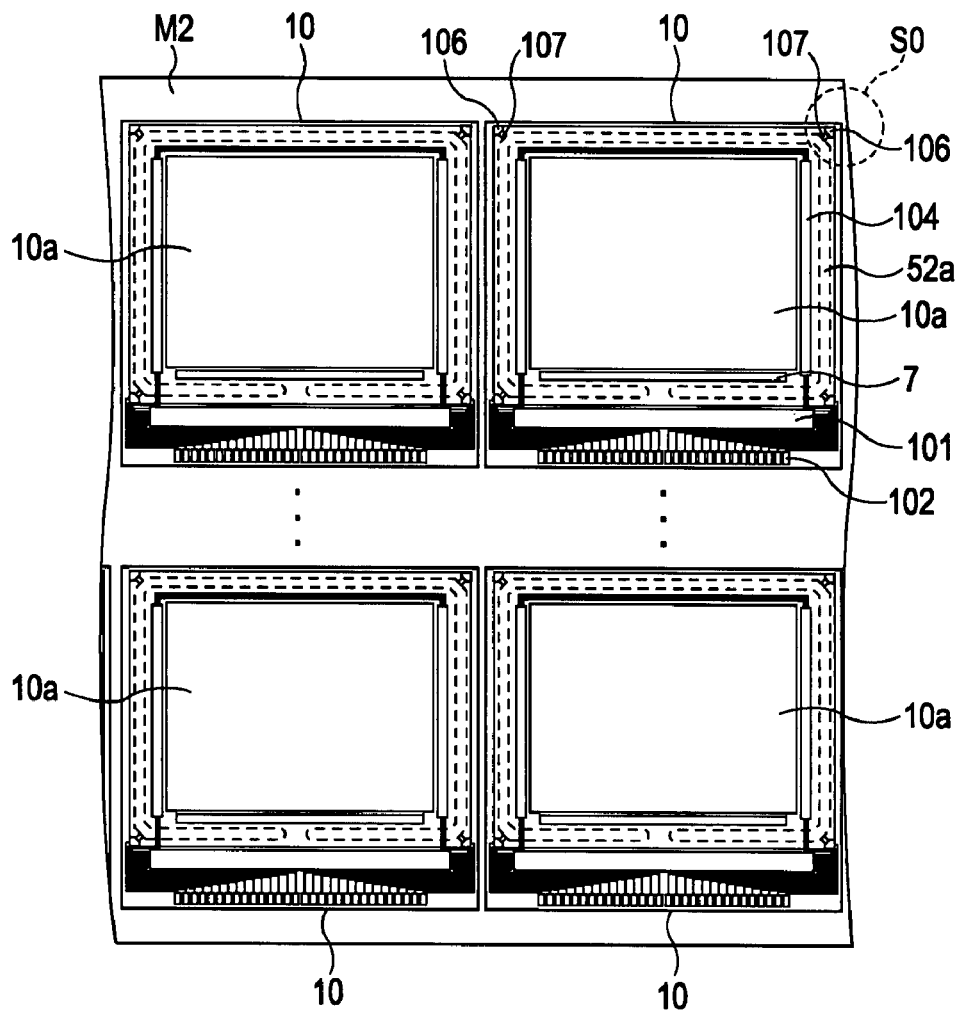
FIG. 23A is a plan view schematically showing the configuration of a liquid crystal device on a large substrate according to a comparative example for the third embodiment.
Figure 23B:
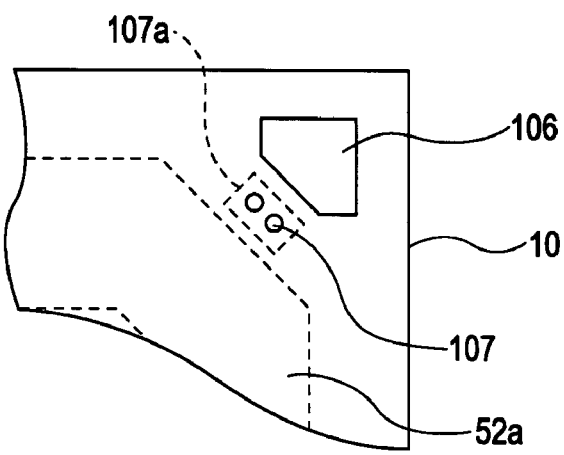
FIG. 23B is an enlarged view of a partial configuration surrounded by a dotted line in FIG. 23A.

Now, a comparative example for the method of manufacturing the liquid crystal device according to the fourth embodiment will be described with reference to FIGS. 23A and 23B. FIG. 23A is a plan view schematically showing the configuration of the liquid crystal device on the large substrates, and FIG. 23B is an enlarged view showing a partial configuration corresponding to the portion surrounded by a dotted line in FIG. 23A.

This comparative example will be described with reference to FIG. 23 in the context of a case where a liquid crystal device configured as shown in FIG. 7 is manufactured.

In the comparative example, referring to FIG. 23A, on the second large substrate M2, various elements such as the vertical-conduction terminals 106, the data-line driving circuit 101, and the scanning-line driving circuits 104 are formed. Then, the opposing substrate 20 having the opposing electrode 21 and other elements thereon, obtained separately by cutting a first large substrate not shown in FIG. 23A, is bonded via the sealing member 52 for each pair of the opposing substrate 20 and the TFT array substrate 10, whereby a liquid crystal device is manufactured.

On the second large substrate M2, in the peripheral region on each TFT array substrate 10, alignment marks 107 are provided. FIG. 23B is an enlarged view showing the configuration of a portion S0 surrounded by a dotted line in FIG. 23A. Referring to FIG. 23B, the alignment marks 107 are provided in an alignment region having, for example, a rectangular shape in plan. For example, for the purpose of mechanical reading, the alignment region 107a may have a vertical or horizontal size on the order of 500 µm to 1 mm.

Since the second large substrate M2 is cut with the individual opposing substrates 20 bonded with the individual TFT array substrate 10, a substantial cutting margin is needed in the peripheral region of the TFT array substrate 10 so that a portion of the TFT array substrate 10 is projected relative to the opposing substrate 20.

Thus, in the comparative example, since the alignment region 107a and the cutting margin described above are provided, it is difficult to reduce the size of the peripheral region.

In contrast, in the manufacturing process according to the fourth embodiment, the first and second large substrates M1 and M2 are aligned and bonded with each other, so that the individual pairs of the opposing substrate 20 and the TFT array substrate 10 can be aligned and bonded with each other simultaneously. Thus, alignment marks need not be provided for each opposing substrate 20 or TFT array substrate 10 on the first or second large substrate M1 or M2. Furthermore, the first and second large substrates M1 and M2 are cut individually with the first and second large substrates M1 and M2 bonded with each other, for example, on the second large substrate M2, it is not needed to consider factors regarding the opposing substrates 20 in providing margins for the TFT array substrates 10.

Thus, according to the fourth embodiment, it is possible to reduce the peripheral region on the opposing substrate 20 or the TFT array substrate 10, so that the number of steps in the manufacturing process of the liquid crystal device can be reduced and the manufacturing process can be simplified. Furthermore, compared with the configuration where the sealing member 52 has an opening for injecting liquid crystal as shown in FIG. 7, the amount of liquid crystal for filling the gap between the opposing substrate 20 and the TFT array substrate 10 can be reduced to a minimum amount.

5. Electronic Apparatus

Figure 24:
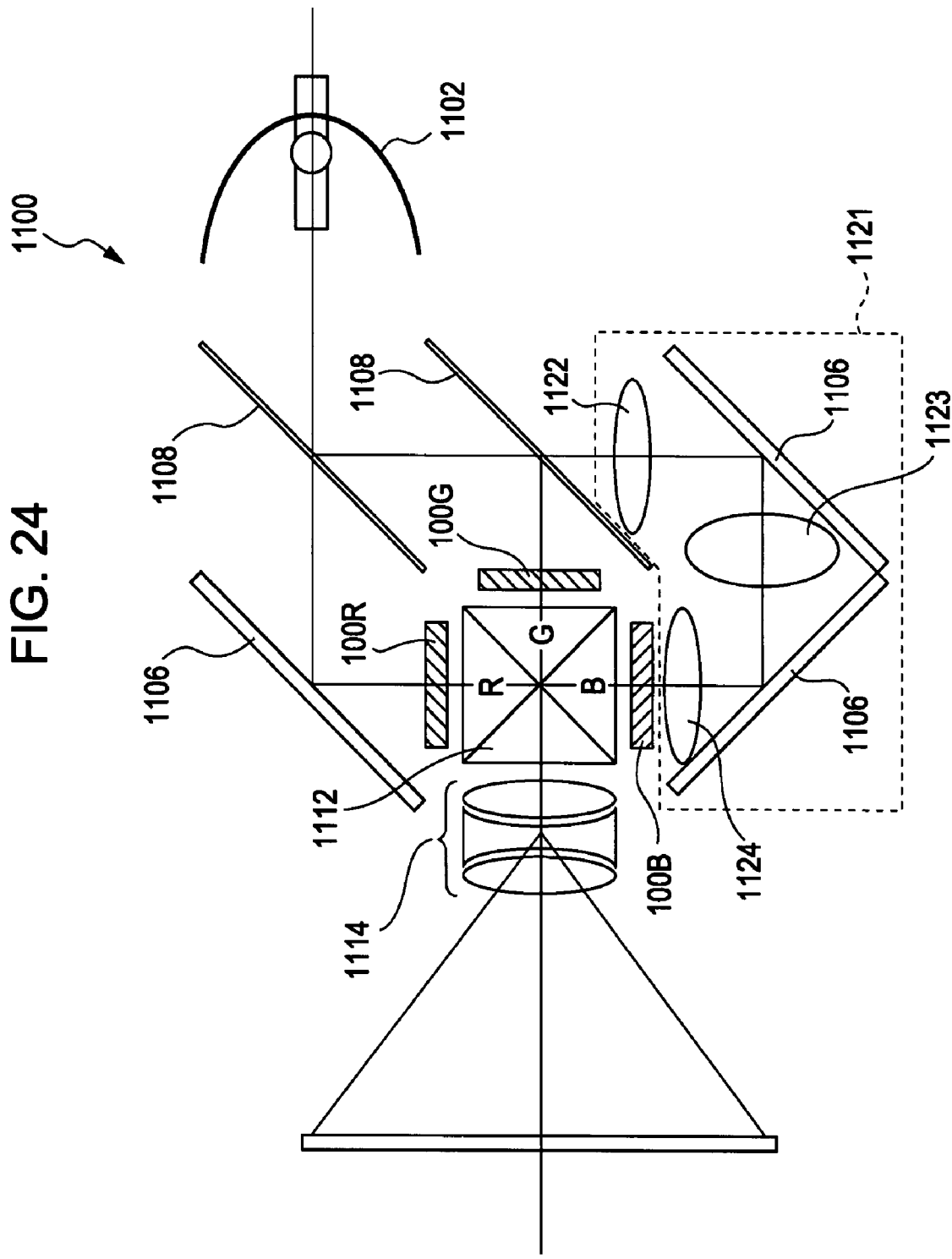
FIG. 24 is a schematic sectional view of a color liquid crystal projector, which is an example of a projection color display apparatus as en electronic apparatus according to an embodiment of the invention.

Next, the overall configuration, particularly the optical configuration, of a projection color display apparatus according to an embodiment of the invention, which is an example of an electronic apparatus including light valves implemented by the electro-optical devices described above, will be described. FIG. 24 is a schematic sectional view of the projection color display apparatus.

Referring to FIG. 24, a liquid crystal projector 1100, which is an example of a projection color display apparatus, includes three liquid crystal modules including liquid crystal devices 100 with a driving circuit mounted on a TFT array substrate. The three liquid crystal modules are used as light valves 100R, 100G, and 100B for red, green, and blue, respectively. In the liquid crystal projector 1100, when light is projected by a lamp unit 1102 that functions as a white light source, such as a metal halide lamp, the light is separated into light components R, G, and B corresponding to the three primary colors by three mirrors 1106 and two dichroic mirrors 1108, and the light components R, G, and B are directed to the light valves 100R, 100G, and 100B, respectively. In particular, in order to prevent light loss due to a long light path, the light component B is directed via a relaying lens system 1121 including an entrance lens 1122, a relay lens 1123, and an exit lens 1124. Light components corresponding to the three primary colors, respectively modulated by the light valves 100R, 100G, and 100B, are recombined by a dichroic prism 1112, and the resulting light is projected on a screen 1120 via a projection lens 1114 to form a color image.

The present invention is not limited to the embodiments described above, and modifications thereof can be made as appropriate without departing from the gist or the spirit of the present invention as understood from the claims and the specification. Electro-optical devices and electronic apparatuses including electro-optical devices with such modifications also fall within the technical scope of the present invention.

The entire disclosure of Japanese Patent Application No. 2006-173932, filed Jun. 23, 2006 is expressly incorporated by reference herein.

What is claimed is:

1. An electro-optical device comprising:
    a pair of an opposing substrate and an element substrate opposing each other;
    a plurality of pixel electrodes arrayed on the element substrate in a pixel region;
    a sealing member with which the opposing substrate and the element substrate are bonded with each other, the sealing member being provided in a sealing region located around the pixel region;
    an opposing electrode provided on the opposing substrate so as to oppose the plurality of pixel electrodes;
    a vertical-conduction electrode formed in the sealing region, the sealing region extending along at least one edge of the element substrate;
    a vertical-conduction member provided in the sealing region and electrically connected to the vertical-conduction electrode and the opposing electrode; and
    a frame-shaped dummy region located around the pixel region, the vertical-conduction electrode extending at least partially into the frame-shaped dummy region.

2. The electro-optical device according to claim 1, wherein the vertical-conduction electrode is formed at least partially in a frame-shaped region located inside the sealing region and around the pixel region.

3. The electro-optical device according to claim 2, wherein the vertical-conduction electrode extends into a frame-shaped region located in a portion inside a perimeter of the pixel region.

4. The electro-optical device according to claim 1, wherein the vertical-conduction electrode is provided as an opposing-electrode-potential line through which an opposing-electrode potential is supplied to the opposing electrode, is formed from a conductive film provided in a layer below the plurality of pixel electrodes via an inter-layer insulating film, and is exposed from the inter-layer insulating film at least partially in the sealing region.

5. The electro-optical device according to claim 1, further comprising an opposing-electrode-potential line provided on the element substrate, through which an opposing-electrode potential is supplied to the opposing electrode, the opposing-electrode-potential line being formed from a conductive film provided in a layer below the plurality of pixel electrodes via an inter-layer insulating film so as to overlap the vertical-conduction electrode at least partially, wherein the vertical-conduction electrode is formed from the same film as the plurality of pixel electrodes at least partially, and is electrically connected to the opposing-electrode-potential line via a contact hole provided in the inter-layer insulating film.

6. The electro-optical device according to claim 5, wherein the opposing-electrode-potential line is formed at least partially in a frame-shaped region located inside the sealing region and around the pixel region.

7. The electro-optical device according to claim 5, wherein the opposing-electrode-potential line is formed from the same film as a conductive film forming either or both lines and electronic elements that are used to drive the plurality of pixel electrodes.

8. The electro-optical device according to claim 1, further comprising a peripheral circuit that drives the plurality of pixel electrodes, the peripheral circuits being provided in the peripheral region on the element substrate, wherein the vertical-conduction electrode is formed so as not to overlap circuit elements of the peripheral circuit.

9. The electro-optical device according to claim 1, wherein the vertical-conduction member is provided in the sealing member and also functions as a gap member so that the opposing substrate and the element substrate have a predetermined gap therebetween.

10. The electro-optical device according to claim 1, wherein the sealing member is composed of a conductive material and also functions as the vertical-conduction member.

11. The electro-optical device according to claim 1, wherein a plurality of external-circuit connecting terminals is provided in a projected region on the element substrate, the projected region being projected relative to the opposing substrate, and the opposing substrate is disposed so that the element substrate is projected in the projected region relative to the opposing substrate and so that a portion of the opposing substrate located on an opposite side of the projected region with respect to the pixel region is projected relative to the element substrate.

12. An electronic apparatus comprising the electro-optical device according to claim 1.

13. An electro-optical device comprising:
    a pair of an opposing substrate and an element substrate opposing each other;
    a plurality of pixel electrodes arrayed on the element substrate in a pixel region;
    a sealing member with which the opposing substrate and the element substrate are bonded with each other, the sealing member being provided in a sealing region located around the pixel region;
    an opposing electrode provided on the opposing substrate so as to oppose the plurality of pixel electrodes;
    a vertical-conduction electrode formed in the sealing region, the sealing region extending along at least one edge of the element substrate;
    a vertical-conduction member provided in the sealing region and electrically connected to the vertical-conduction electrode and the opposing electrode; and
    an opposing-electrode-potential line provided on the element substrate, through which an opposing-electrode potential is supplied to the opposing electrode, the opposing-electrode-potential line being formed from a conductive film provided in a layer below the plurality of pixel electrodes via an inter-layer insulating film so as to overlap the vertical-conduction electrode at least partially;
    wherein the vertical-conduction electrode is formed from the same film as the plurality of pixel electrodes at least partially, and is electrically connected to the opposing-electrode-potential line via a contact hole provided in the inter-layer insulating film;
    wherein the opposing-electrode-potential line is formed at least partially in a frame-shaped region located inside the sealing region and around the pixel region; and
    wherein the opposing-electrode-potential line extends into a frame-shaped region located in a portion inside a perimeter of the pixel region.

14. An electro-optical device comprising:
    a pair of an opposing substrate and an element substrate opposing each other;
    a plurality of pixel electrodes arrayed on the element substrate in a pixel region;
    a sealing member with which the opposing substrate and the element substrate are bonded with each other, the sealing member being provided in a sealing region located around the pixel region;
    an opposing electrode provided on the opposing substrate so as to oppose the plurality of pixel electrodes;
    a vertical-conduction electrode formed in the sealing region, the sealing region extending along at least one edge of the element substrate; and
    a vertical-conduction member provided in the sealing region and electrically connected to the vertical-conduction electrode and the opposing electrode;
    wherein the plurality of pixel electrodes is arrayed in a frame-shaped dummy region located in the pixel region and in an effective region other than the dummy region, and wherein the pixel electrodes provided in the dummy region among the plurality of pixel electrodes function as dummy electrodes.

* * * * *